United States Patent
Newcomb

(10) Patent No.: US 12,400,172 B2
(45) Date of Patent: Aug. 26, 2025

(54) ILLUMINATED ADDRESS SIGN ASSEMBLY WITH INTEGRATED SECURITY FEATURES

(71) Applicant: Royce Newcomb, Fresno, CA (US)

(72) Inventor: Royce Newcomb, Fresno, CA (US)

(*) Notice: Subject to any disclaimer, the term of this patent is extended or adjusted under 35 U.S.C. 154(b) by 758 days.

(21) Appl. No.: 17/137,119

(22) Filed: Dec. 29, 2020

(65) Prior Publication Data

US 2021/0117915 A1  Apr. 22, 2021

Related U.S. Application Data

(63) Continuation-in-part of application No. 16/837,659, filed on Apr. 1, 2020, now Pat. No. 10,878,730.
(Continued)

(51) Int. Cl.
*G06Q 10/00* (2023.01)
*G06Q 10/0833* (2023.01)
(Continued)

(52) U.S. Cl.
CPC .......... *G06Q 10/0833* (2013.01); *G09F 7/00* (2013.01); *G09F 13/005* (2013.01); *G09F 13/0445* (2021.05); *G09F 27/004* (2013.01); *H04W 4/021* (2013.01); *G01S 19/42* (2013.01); *G09F 7/18* (2013.01); *G09F 2007/1843* (2013.01);
(Continued)

(58) Field of Classification Search
CPC ..... G06Q 10/0833; G09F 7/00; G09F 13/005; G09F 13/0445; G09F 27/004; G09F 7/18; G09F 13/0413; G09F 13/0481; G09F 13/08; G09F 27/005; G09F 27/007; G09F 2007/1843; G09F 2007/1852; G09F 2027/001; G09F 2013/1872; G09F 13/18; G09F 2013/1831; H04W 4/021; H04W 4/029; G01S 19/42
See application file for complete search history.

(56) References Cited

U.S. PATENT DOCUMENTS 3,360,791 A  12/1967  Nandor
4,587,753 A   5/1986  Harper
(Continued)

FOREIGN PATENT DOCUMENTS

CN   110745146 A  *  2/2020  ............ B60W 40/04
WO   2016093542 A1    6/2016
WO   2021201889 A1   10/2021

OTHER PUBLICATIONS

International Search Report and Written Opinion dated Aug. 11, 2020 for PCT/US20/030891 from the U.S. Receiving Office, pp. 1-15, United States.
(Continued)

*Primary Examiner* — Peter Ludwig
*Assistant Examiner* — Jessica E Sullivan
(74) *Attorney, Agent, or Firm* — Barry Choobin; Patent 360

(57) ABSTRACT

One embodiment provides a mapping device including a memory configured to store instructions. A processor is configured to execute the instructions to: receive geolocation information for the mapping device from a global positioning system (GPS) device; receive unique identification information; transmit the geolocation information and the unique identification information through a network; and cause an update to prior geolocation information that corresponds to an address in a mapping database.

15 Claims, 27 Drawing Sheets

Related U.S. Application Data

(60) Provisional application No. 62/923,543, filed on Oct. 19, 2019.

(51) Int. Cl.

| | | |
|---|---|---|
| *G09F 7/00* | (2006.01) | |
| *G09F 13/00* | (2006.01) | |
| *G09F 13/04* | (2006.01) | |
| *G09F 27/00* | (2006.01) | |
| *H04W 4/021* | (2018.01) | |
| *G01S 19/42* | (2010.01) | |
| *G09F 7/18* | (2006.01) | |
| *G09F 13/08* | (2006.01) | |

(52) U.S. Cl.
CPC .. *G09F 2007/1852* (2013.01); *G09F 13/0413* (2013.01); *G09F 13/0481* (2021.05); *G09F 13/08* (2013.01); *G09F 2027/001* (2013.01); *G09F 27/005* (2013.01); *G09F 27/007* (2013.01)

(56) References Cited

U.S. PATENT DOCUMENTS

| | | | |
|---|---|---|---|
| 4,686,505 A | 8/1987 | Vanderburg | |
| 4,931,780 A | 6/1990 | Lamont et al. | |
| 4,993,058 A | 2/1991 | McMinn et al. | |
| 5,435,087 A | 7/1995 | Karkar | |
| 5,521,578 A | 5/1996 | DelValle | |
| 5,573,328 A | 11/1996 | Hwang | |
| 5,615,501 A | 4/1997 | Rice | |
| 5,911,524 A | 6/1999 | Wilton | |
| 6,060,838 A | 5/2000 | Cantoni et al. | |
| 6,367,180 B2 | 4/2002 | Weiss et al. | |
| 6,401,373 B1 | 6/2002 | Sexton | |
| 6,901,688 B1 | 6/2005 | King | |
| 7,259,670 B2 | 8/2007 | Cunningham et al. | |
| 7,540,628 B2 | 6/2009 | Awai et al. | |
| 7,578,085 B1 | 8/2009 | Chao et al. | |
| 8,826,572 B2 * | 9/2014 | Kaoh | G02B 6/0091 40/544 |
| 9,046,374 B2 * | 6/2015 | Ricci | B60W 30/182 |
| 9,691,307 B2 | 6/2017 | Braunstein | |
| 9,961,507 B1 * | 5/2018 | Mendelson | H04W 4/029 |
| 2003/0121191 A1 | 7/2003 | Dejarnette et al. | |
| 2005/0055856 A1 | 3/2005 | Johnston et al. | |
| 2006/0150453 A1 | 7/2006 | Martin et al. | |
| 2006/0201776 A1 * | 9/2006 | Myers | G07F 9/02 194/350 |
| 2008/0155871 A1 | 7/2008 | Parker et al. | |
| 2008/0162034 A1 * | 7/2008 | Breen | G01C 21/3461 701/533 |
| 2014/0062730 A1 * | 3/2014 | Berkobin | B60R 25/1004 340/989 |
| 2015/0130350 A1 * | 5/2015 | Braunstein | H05B 47/115 315/86 |
| 2015/0269876 A1 | 9/2015 | Grosser, III et al. | |
| 2015/0330787 A1 * | 11/2015 | Cioffi | G01C 21/20 701/538 |
| 2019/0057674 A1 * | 2/2019 | Hoppe | G06F 1/26 |
| 2019/0206289 A1 | 7/2019 | St. John | |
| 2019/0213931 A1 * | 7/2019 | Brubaker | B60Q 1/2607 |

OTHER PUBLICATIONS

U.S. Notice of Allowance for U.S. Appl. No. 16/837,659 mailed Aug. 12, 2020.

* cited by examiner

ILLUMINATED ADDRESS SIGN ASSEMBLY WITH INTEGRATED SECURITY FEATURES

CROSS-REFERENCE TO RELATED APPLICATIONS

This application is a continuation-in-part to patent application of U.S. Ser. No. 16/837,659 filed on Apr. 1, 2020, now U.S. Pat. No. 10,878,730 issued on Dec. 29, 2020, which claims priority to the U.S. provisional patent application Ser. No. 62/923,543 filed on Oct. 19, 2019, entitled "eLiT," which are both incorporated herein by reference in their entirety.

FIELD

The present embodiments relate to an illuminated address sign assembly for a building, and in more particular, to illuminated address sign assemblies with emergency signaling and other integrated security features for home, office, and similar buildings.

BACKGROUND

Address signs for use on the exterior of houses, apartments, offices, and other buildings are well known. The address signs help those who are looking for the building through its address provided as an address sign in exterior areas of the building. The address signs generally include a frame to which an address plaque is mounted. The address plaque has on it imprinted alphanumeric characters representing the address of the building. Suitable places on the exterior of the buildings generally include front of a building, such as on the wall, door, letter-box pole, and like. The choice of place for mounting the address sign depends upon visibility from outside, such as a those desirous to locate the building could easily see the address sign.

The conventional address signs have one or more shortcomings, such as reduced visibility in the dark. A light bulb is known to be mounted near the address plaque to illuminate the address plaque in the evening and night, however, such illumination does not enhance the visibility of the alphanumeric characters representing the address significantly. The lack of good visibility of address poses a risk during distress and emergencies, wherein the emergency crew may not be able to locate the address quickly. For example, during a fire in a building, it will be desired that the firefighters could quickly locate the building, without any wastage of time in locating the correct address. According to a hypothesis, 25-30% of the calls, firefighters struggle to find the right address because house numbers cannot be seen especially at night. The emergency crews have always insisted to have properly marked addresses.

Delivery companies is another service area affected by improper addresses. A delivery person may waste a lot of time finding the desired address, thus making the job costlier, besides causing delays in deliveries and pickups. Thus, a need is appreciated for an improved address sign assembly with flash signaling and other integrated security features for home, apartments, offices and similar buildings.

SUMMARY

One embodiment provides a mapping device including a memory configured to store instructions. A processor is configured to execute the instructions to: receive geolocation information for the mapping device from a global positioning system (GPS) device; receive unique identification information; transmit the geolocation information and the unique identification information through a network; and cause an update to prior geolocation information that corresponds to an address in a mapping database.

Another embodiment provides a method that includes receiving, by a mapping device, geolocation information for the mapping device from a GPS device. The mapping device further receives unique identification information. The mapping device additionally transmits the geolocation information and the unique identification information through a network. The method further includes causing an update to prior geolocation information that corresponds to an address in a mapping database.

Yet another embodiment provides a computer program product for updating geolocation information for an address, the computer program product comprising a non-transitory computer readable storage medium having program instructions embodied therewith, the program instructions executable by a processor to cause the processor to: receive, by the processor, geolocation information for a mapping device from a GPS device; receive, by the processor, unique identification information; transmit, by the processor, the geolocation information and the unique identification information through a network; and cause, by the processor, updating of prior geolocation information using the geolocation information. The prior geolocation information corresponds to an address in a mapping database.

These and other features, aspects and advantages of the embodiments will become understood with reference to the following description, appended claims and accompanying figures.

BRIEF DESCRIPTION OF THE DRAWINGS

The accompanying figures, which are incorporated herein, form part of the specification and illustrate one or more embodiments. Together with the description, the figures further explain the principles of the embodiments and to enable a person skilled in the relevant arts to make and use the embodiments.

Figure 1:
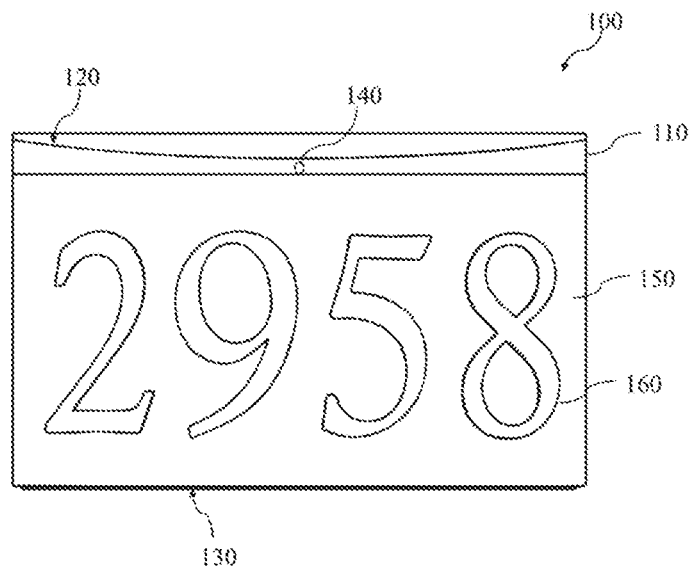
FIG. 1 is a front side of an illuminated address sign assembly, according to one embodiment.

Although the specific features of the embodiments are shown in some drawings and not in others. This is done for convenience only, as each feature may be combined with any or all the other features in accordance with the embodiments herein.

DETAILED DESCRIPTION

In the following detailed description, a reference is made to the accompanying drawings that form a part hereof, and in which the specific embodiments that may be practiced is shown by way of illustration. These embodiments are described in enough detail to enable those skilled in the art to practice the embodiments and it is to be understood that the logical, mechanical, and other changes may be made without departing from the scope of the embodiments. The following detailed description is therefore not to be taken in a limiting sense.

The following discussion is directed to various embodiments of the present disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

Various terms are used to refer to particular system components. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct communication between two or more elements, whether or not those elements are in physical contact with one another. Thus, if a first device couples to a second device, that connection may be through a direct connection or through an indirect connection via other devices and connections. The coupling can occur through two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely.

The terminology used herein is for the purpose of describing particular example embodiments only and is not intended to be limiting. As used herein, the singular forms "a," "an," and "the" may be intended to include the plural forms as well, unless the context clearly indicates otherwise. The method steps, processes, and operations described herein are not to be construed as necessarily requiring their performance in the particular order discussed or illustrated, unless specifically identified as an order of performance. It is also to be understood that additional or alternative steps may be employed.

The terms first, second, third, etc. may be used herein to describe various elements, components, regions, layers and/or sections; however, these elements, components, regions, layers and/or sections should not be limited by these terms. These terms may be only used to distinguish one element, component, region, layer, or section from another region, layer, or section. Terms such as "first," "second," and other numerical terms, when used herein, do not imply a sequence or order unless clearly indicated by the context. Thus, a first element, component, region, layer, or section discussed below could be termed a second element, component, region, layer, or section without departing from the teachings of the example embodiments. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. In another example, the phrase "one or more" when used with a list of items means there may be one item or any suitable number of items exceeding one.

Various functions described below can be implemented or supported by one or more computer programs or computer program products, each of which is formed from computer readable program code or instructions and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some embodiments are directed to an illuminated address sign assembly having improved visibility of an address, especially after dark. One or more embodiments relate to an illuminated address sign assembly that also provides for emergency signaling. Some embodiments relate to an illuminated address sign assembly that also provides for signaling an opted-in delivery company. One or more embodiments provide the feature that the illuminated address sign assembly provides enhanced readability of an address, especially after dark. Some embodiments include the feature that an illuminated address sign assembly is economical to manufacture.

In one or more embodiments, an illuminated address sign assembly comprises a frame having an open front side, an open rear side, a top, a bottom, a left, and a right side forming an enclosure. The open front side of the frame can be configured to interchangeably receive a first address plaque or a first opaque plaque. The open rear side of the frame can be configured to interchangeably receive a second address plaque or a second opaque plaque, wherein at least one of the open front side or the open rear side receives the address plaque. The address plaque includes an opaque indicia superimposed on a surface of a translucent backlit panel, the opaque indicia representing an address. In one case, the opaque indicia can be alphanumeric characters representing the address of the building. The opaque indicia can be configured to be highlighted against the illuminated translucent backlight panel; thus, the address is visible, especially in the dark. The address plaque under normal conditions can be illuminated by white light, resulting in an enhanced contrast for the opaque alphanumeric indicia. In one case, the color of the opaque indicia can be red, blue, or any other color, providing a good contrast against the white light illuminated translucent panel. The inner surface of the opaque plaque can be provided with a layer of reflective material.

In some embodiments, the address plaque may be illuminated by a light source. The light source may be positioned inside the frame, for example, the light source can be mounted on the inner walls of the frame. The light source can be, in one case, light emitting diode (LED) lights configured to produce at least two colors. In one case, the LED could be red, green and blue (RGB) lights that can be configured to produce multiple colors. The light source is coupled to a control unit housed in the frame. The control unit can turn the light source on and off. Moreover, the control unit can trigger the LED to produce a preprogrammed color. Also, the control unit can cause any specific color LED to flash for signaling. In one case, the address plaque can be illuminated by a white light, the emergency signaling can provide as a flashing red light and signaling for an opted-in delivery company be provided as a green light. The color can be dedicated to each service.

In one or more embodiments, a light sensor is coupled to the frame for detecting the intensity of external light, i.e., sunlight. The light sensor can be coupled to the control unit for automatically controlling the illumination of the address plaque. The control unit, through the light sensor, can detect the onset of dusk and automatically turn the light source ON for illuminating the address plaque. Similarly, the onset of dawn can be detected by the light sensor, and upon detection of the dawn, the control unit, through light sensor, causes the LED lights to turn OFF. In addition, the light source can be illuminated during the day, and the control unit, through the light sensor, can detect the onset of dusk and automatically increase the power to the light source for increasing the illumination of the address plaque. Alternately, the control unit, through the light sensor, can detect the onset of dusk and automatically direct power to an additional light source for increasing the illumination of the address plaque. Similarly, the onset of dawn can be detected by the light sensor, and upon detection of the dawn, the control unit, through the light sensor reduces power to the LED lights to decrease illumination, or turns off some LED lights to decrease illumination but still provides some illumination of the sign during the day.

In some embodiments, the illuminated address sign assembly comprises a global positioning system (GPS) unit having an inbuilt GPS antenna. In a preferred embodiment, the GPS unit can have an accuracy of up to 1 meter. In a more preferred embodiment, the GPS unit can have an accuracy of up to 12 inches. The GPS unit can determine the geographic coordinates of the illuminated address sign assembly into which the GPS unit is configured. The position coordinates can be coupled with the address of the illuminated address sign assembly. The illuminated address sign assembly can update one or more navigation systems with the address and geographic coordinates of the address.

In one or more embodiments, the illuminated address sign assembly is powered by a portable battery housed in the frame. In one embodiment, the portable battery is a rechargeable battery. In some embodiments, the portable battery is a rechargeable lithium-ion battery. The portable rechargeable battery may last for about one year on a single charge. To further extend the battery life, the illuminated address sign assembly may further include a solar panel, according to one or more embodiments. The solar panel may be mounted on the top side of the frame. The top side of the frame may be sloped, such that the solar panel mounted on the top side of the frame can receive maximum sunlight. The solar panel may recharge the portable battery during the day, thus increasing the battery life.

In other embodiments the illuminated address sign assembly which is powered by a portable battery housed in the frame, includes a second back-up portable battery housed in the frame. The second back-up portable battery is a rechargeable lithium-ion battery. The second back-up portable battery provides power for the illuminated address sign assembly when the portable battery no longer has sufficient charge to power the illuminated address sign. The illuminated address sign can include a low battery indicator light to indicate that the portable battery needs to be recharged. The portable battery can be removed from the illuminated address sign assembly and place in a battery charger for recharging. While the portable battery is being recharged, the second back-up portable battery provides power to the illuminated address sign assembly. The portable battery can also be recharged while still in the illuminated address sign assembly by plugging a battery charger into a charging port in the illuminated address sign assembly. The illuminated address sign can also inform the user of the need for recharging the portable battery wirelessly through remote device such as a mobile phone app.

In some embodiments, the illuminated address sign assembly comprises a two-way camera mounted to the frame, preferably to the lower side of the frame. The camera can be coupled with motion sensors that could detect the presence of a person nearby the illuminated address sign assembly and inform the same to a concerned authority or user. Besides the camera, a speaker and microphone may also be configured in the illuminated address sign assembly, which provides for speaking or signaling a visitor standing nearby the illuminated address sign assembly.

In one or more embodiments, the control unit includes network circuitry for communicating via Wi-Fi, BLUETOOTH®, via the Internet, cellular service, etc. The control unit may be configured in the frame for controlling different functions of the illuminated address sign assembly. For example, the control unit can be connected to the light sensor, light source, camera, mic, solar panel, and battery. The control unit permits remotely controlling the working and configuration of the illuminated address sign assembly. The illuminated address sign assembly can be wired or wirelessly coupled to a remote device for controlling one or more functions of the illuminated address sign assembly. For example, the illuminated address sign assembly can be coupled to a smartphone, laptop, tablet computer, and like through a BLUETOOTH® connection. The remote control can be coupled to the illuminated address sign assembly for controlling the one or more functions of the illuminated address sign assembly. For example, triggering the emergency signaling remotely from within the house.

In some embodiments, the control unit is further configured to receive details of a summoned first responder, i.e., a unique device id of a first responder. The same device id can be used to detect the entry of such first responder within a predetermined area of the illuminated address sign assembly. On detecting the entry of the first responder, within the predetermined area, the illuminated address sign assembly can trigger the red-light source to signal the approaching first responder. For example, the illuminated address sign assembly can detect the presence of a summoned ambulance, approaching the building and reaches within 0.25 miles from the illuminated address sign assembly. In response to the detection of the ambulance within the 0.25 miles range, the illuminated address sign assembly can trigger the emergency signaling i.e., flashing red light source. Like the first responder, the illuminated address sign assembly can be embodied with details of other service providers, such as an opted-in delivery company.

In one or more embodiments, the rear side of the frame is configured with first attachment points for mounting the illuminated address sign assembly to a rigid surface, such as a wall or a door. The first attachment points can be hooks that can couple to a bracket, wherein the brackets have apertures to receive the hooks. The bracket can be mounted to the rigid surface. Furthermore, the illuminated address sign assembly can further include second attachment points for attaching suction cups. The suction cups can couple to a glass surface for mounting the illuminated address sign assembly to the glass surface.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein includes all such modifications.

Figure 2:
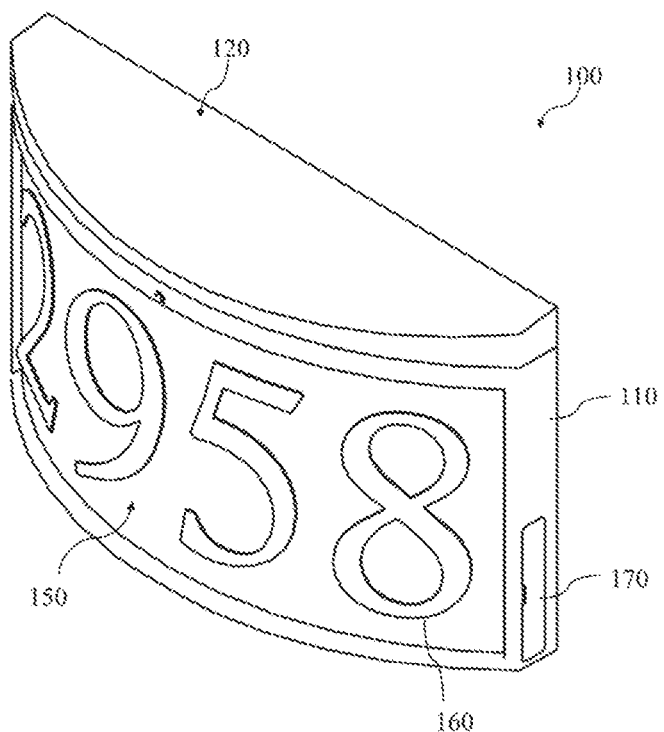
FIG. 2 is a perspective view of the illuminated address sign assembly of FIG. 1, according to one embodiment.
Figure 3:
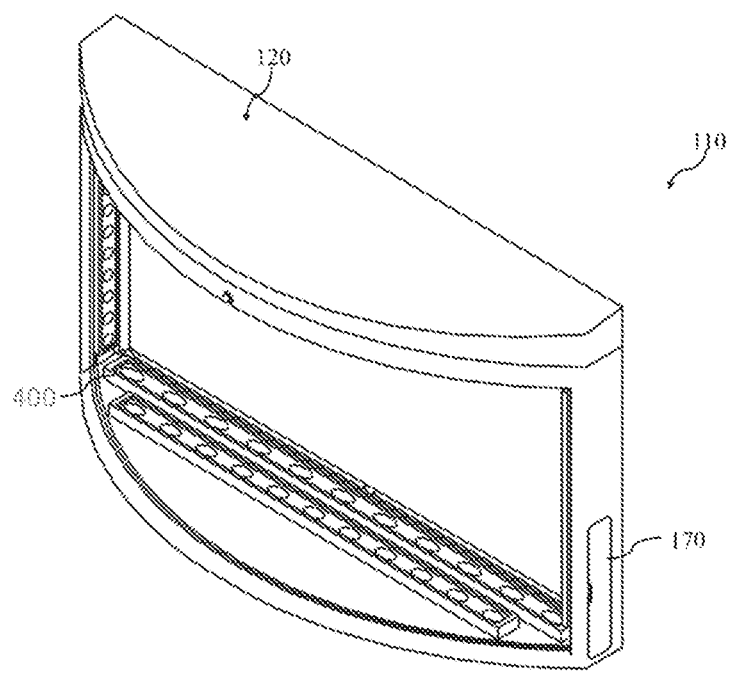
FIG. 3 is a perspective view of a frame of the illuminated address sign assembly, according to one embodiment.
Figure 4:
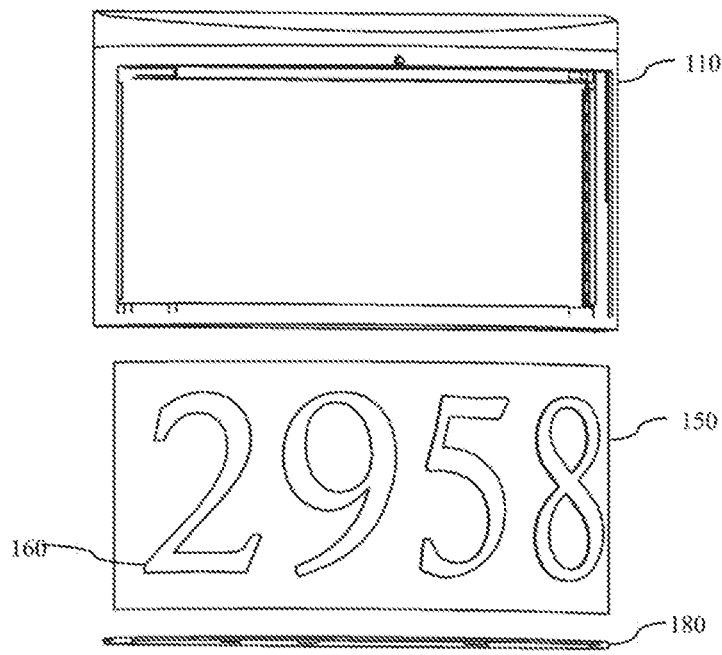
FIG. 4 is an exploded view of the illuminated address sign assembly of FIG. 1 showing the address plaque and the base bracket, according to one embodiment.
Figure 5:
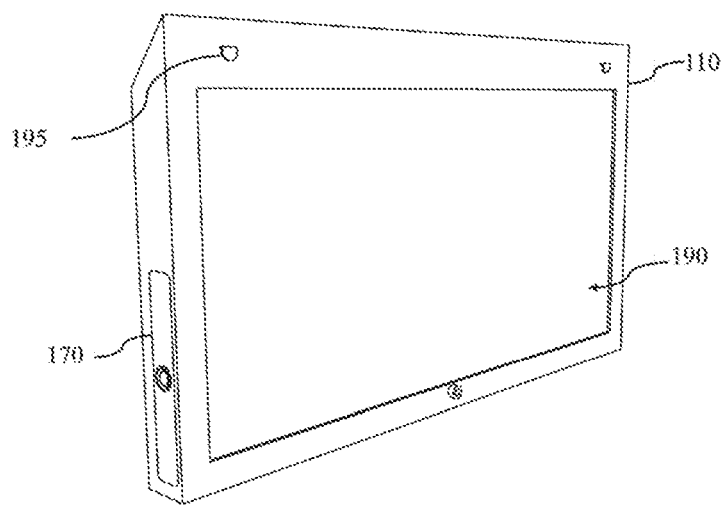
FIG. 5 is a rear side of the illuminated address sign assembly of FIG. 1, according to one embodiment.
Figure 6:
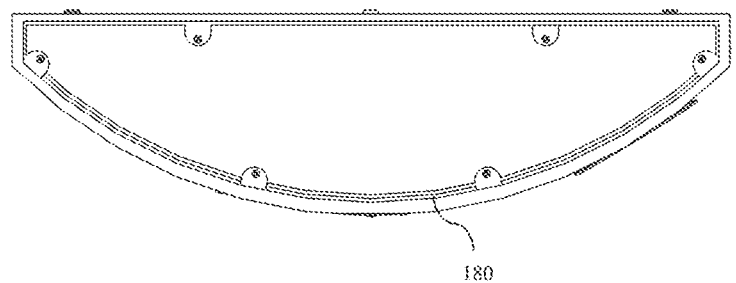
FIG. 6 is a bottom view of the illuminated address sign assembly of FIG. 1 showing the base bracket, according to one embodiment.
Figure 7:
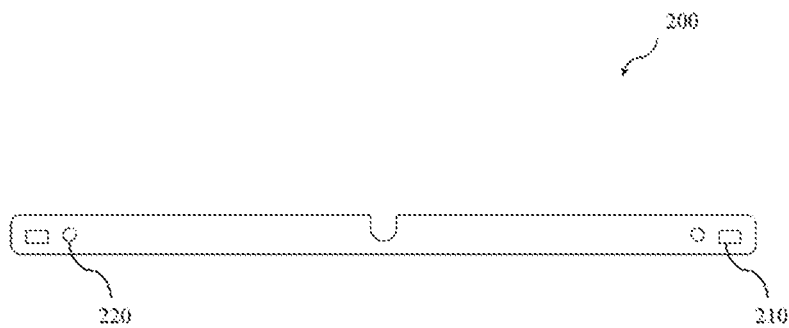
FIG. 7 shows a bracket for mounting the illuminated address sign assembly of FIG. 1, according to one embodiment.

Some embodiments are directed to a novel illuminated address sign assembly. Now referring to FIGS. 1 to 7 which shows an exemplary embodiment of the illuminated address sign assembly. FIG. 1 is a front view of the illuminated address sign assembly 100 showing a frame 110, an address plaque 150, an opaque indicia 160, a light sensor 140 configured into the frame 110. The frame having the top side 120 and a bottom side 130. FIG. 2 is a perspective view showing the frame 110 and the address plaque 160. Further shown in FIG. 2 is a battery cover 170. FIG. 3 is a perspective view of the frame 110 showing the light source 400 and the battery cover 170. FIG. 4 is an exploded view showing the frame 110, address plaque 150, and the base bracket 180. FIG. 5 is the rear view of the illuminated address sign assembly showing the battery cover 170, an opaque plaque 190, and hooks 195. FIG. 6 shows the bottom of the illuminated address sign assembly showing a base bracket 180 used for securing the address plaque 150 and the opaque plaque 190 to the frame 110. FIG. 7 shows a bracket 200 used for mounting the illuminated address sign assembly to a rigid surface.

The illuminated address sign assembly is shown in FIG. 1-7 includes a frame having a front side, a rear side, top side, bottom side, left side, and right side forming an enclosure. The frame 110 shown in FIG. 3 is having a curve-shaped front side and a flat rear side. It is, however, to be noted that both the front side and the rear sides can be flat, or both the front side and the rear sides can be curved, or the front side can be flat, and the rear side can be curved. The front side and the rear side of the frame are configured to receive either an address plaque or an opaque plaque. Depending upon the shape of the frame, the curved side of the frame can receive a curved address plaque or a curved opaque plaque. Similarly, a flat side of the frame can receive a flat address plaque or a flat opaque plaque. In one case, the illuminated address sign assembly can be provided with both the curved and flat opaque plaques and address plaques. This can allow a user to interchange between different configurations. The address plaque mounted to the front side of the frame 110 is curved and is having an opaque alphanumeric indicia superimposed on the surface of a translucent backlit panel. The opaque indicia represent the address and may comprise numbers, symbols, and letters. The opaque indicia as shown in FIG. 1 can be of color such as red and blue, that have good contrast against the backlit panel, particularly white light illuminated back panel. Such a contrast of the opaque indicia against the back-lit panel provides enhances the visibility of the address to a person desirous to locate the building. The other side of the frame is flat and can receive a flat opaque plaque. The opaque plaque has an inner surface coated with a reflective material, such as to reflect the light towards the address plaque, thus increasing the intensity of illumination of the address plaque.

The address plaque can be illuminated by a light source 400, shown in FIG. 3. The light source 400 can be an array of LED positioned inside the frame and coupled to the sides of the frame. The light source 400 can be connected to a control unit housed inside the frame. The control unit can control the switching of the light source 400 ON and OFF. Moreover, the control unit can regulate the intensity of the light source 400, for example, the control unit can be configured to switch the intensity of the light source 400 between dim or normal. In one embodiment, the control unit includes several elements including a microprocessor, a printed circuit board, a power supply, and cables of flex circuits connecting the elements. In some embodiments, the microprocessor is mounted on and integrated into the printed circuit board. In one or more embodiments, the power supply is a transformer connected to a direct alternating current (AC) line. Alternately, in some embodiments the power supply includes rechargeable batteries. In one or more embodiments, the power supply may be comprised of a solar photo-voltaic panel and rechargeable batteries, wherein the solar photo-voltaic panel powers the illuminated address sign assembly 100 in sunlight and the batteries provide power when the sun goes down. The solar photo-voltaic panel may also recharge the battery in addition to powering the illuminated address sign assembly 100. Some embodiments include LED light sources, however a skilled person will appreciate that any other light sources may also be used, without departing from the scope of the embodiments. Preferably, the LED light source can produce more than one color. More preferably, the LED can be an RGB LED that can produce multiple colors. While the white light source 400 can be used to illuminate the address plaque, the other colors may serve different purposes. In one case, the red light can be used to signal any emergency or distress situation. The green light can be used to signal any non-emergency situation, for example, to signal an opted-in delivery company. Moreover, the white light source 400 can be stable, but the other light sources can be configured to flash. For example, the red-light source 400 can be configured to flash to send the emergency signal.

The illuminated address sign assembly can be illuminated during dark i.e., evening and night. While during daylight the illumination of the address plaque may not be needed. The light source 400 can be turned ON and OFF remotely, for example, from inside of the building. The control unit can be configured with a network circuitry, such as BLU-ETOOTH®, Wi-Fi, Internet and like technologies known to a skilled person for wirelessly connecting electronic devices. The network circuitry of the control unit allows the illuminated address sign assembly to be remotely connected to a remote device, such as a remote control or a smartphone. An application can be provided for downloading to a smartphone for communicating with the illuminated address sign assembly of the one or more embodiments. Thus, the illuminated address sign assembly can be remotely controlled by a smartphone or remote control. In one case, the light source 400 can be turned ON and OFF remotely, for example from inside of the building. A user in an emergency can remotely trigger the red flash from within the house. Similarly, the user can also remotely trigger the green flash for the opted-in delivery company. Also, the user can increase or decrease the intensity of the white light source 400 remotely.

It is desirous to automate the task of turning the white light source 400 ON during the onset of dark and turn the white light source 400 OFF at the onset of the dawn. Keeping the light source 400 always ON can result in wastage of electricity, decreased battery life, and shortening of the life of the light source 400. Thus, it is desired to provide a light sensor coupled to the control unit of the illuminated address sign assembly. The light sensor can be mounted anywhere in the frame, FIG. 1-7 show the light sensor mounted in the middle of the top side of the frame. The light sensor can detect the intensity of Sunlight and based on the intensity of the Sunlight could control the turning the light source 400 ON and OFF.

In one embodiment, the illuminated address sign assembly includes a global positioning unit. The global positioning unit includes a GPS antenna having an accuracy of 1 meter, and more preferably, having an accuracy of 12 inches. The global positioning unit can be electronically coupled to the control unit of the illuminated address sign assembly. After, installation of the illuminated address sign assembly, the GPS unit can determine the exact geographic coordinates of the illuminated address sign assembly. The control unit upon receiving the geographic coordinates from the GPS unit can couple the address to the GPS coordinates. Thereafter, the control unit can update the address with its position coordinates to one or more navigation systems, for example, GOOGLE® Maps. Thus, those desirous to reach the address, can look in the Google maps to navigate to the exact location. The one or more embodiments simplifies the procedure for updating the navigation system with the correct position coordinates. In case of any change in the address, the control unit can be configured with the new address, and the control unit can automatically update the new geographic coordinates with the new address to the navigation systems.

The illuminated address sign assembly can further comprise a solar panel mounted on the top side of the frame. The solar panel can be provided to recharge the battery, thus extending the battery life. The top side of the frame can be sloped as shown in FIG. 4, such that the solar panel mounted on the top side could receive maximum sunlight.

The illuminated address sign assembly can be mounted to a rigid surface, such as a wall, door, window, postbox pole, and like. The location of the illuminated address sign assembly can be such that a passerby could easily see and read the address depicted on the illuminated address sign assembly. To mount the illuminated address sign assembly to the rigid surface, the illuminated address sign assembly can be provided with a bracket shown in FIG. 7. The bracket can have rectangular apertures 210 to receive the hooks configured on the rear side of the frame. The bracket 200 further includes round apertures 220 for coupling the bracket to the rigid surface. A pair of fasteners, such as self-tapping screws can be used to mount the bracket to the rigid surface. Thereafter, the illuminated address sign assembly can be mounted by hooking the illuminated address sign assembly into the apertures 210.

The address plaque and the opaque plaque have a coupling mechanism for fitting into the frame, wherein the frame also has the corresponding coupling mechanism. For example, the address plaque and the opaque plaque can have flanges on their side which slides into the frame through the bottom. Alternatively, the address plaque and the opaque plaque can snap-fit into the front and rear sides of the frame. The address plaque and the opaque plaque can thereafter be secured through a base bracket coupled to the bottom side of the frame. The base bracket in FIG. 6 is shown to be coupled through screws, however, a skilled person will understand that any other type of fastening mechanism, such as snap fit can be embodied without departing from the scope of the embodiments.

Figure 8:
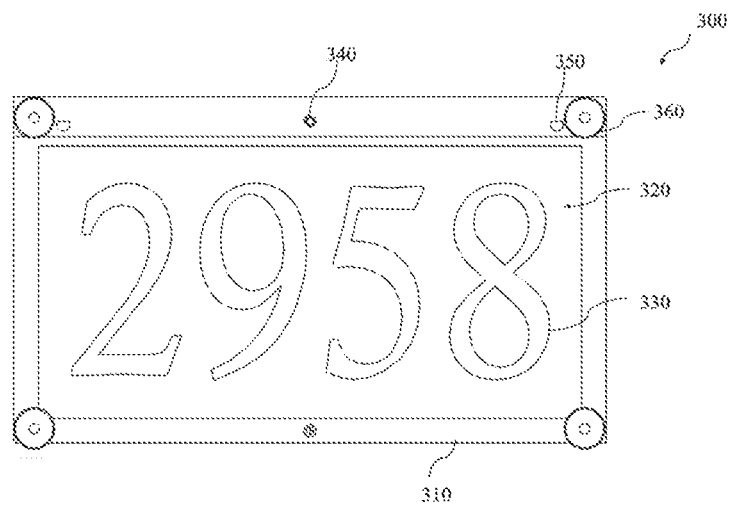
FIG. 8 is the rear side of an illuminated address sign assembly showing the suction cups, according to some embodiments.
Figure 9:
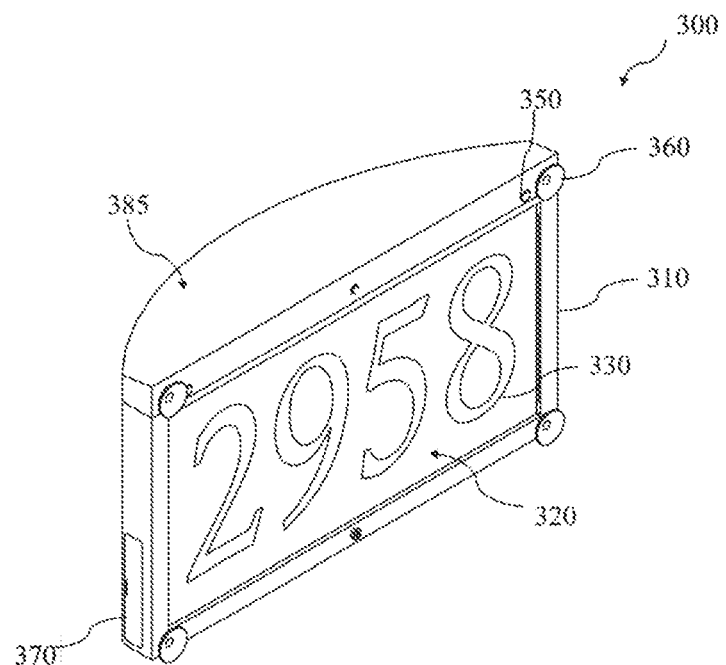
FIG. 9 is a perspective view of the illuminated address sign assembly of FIG. 8, according to some embodiments.
Figure 10:
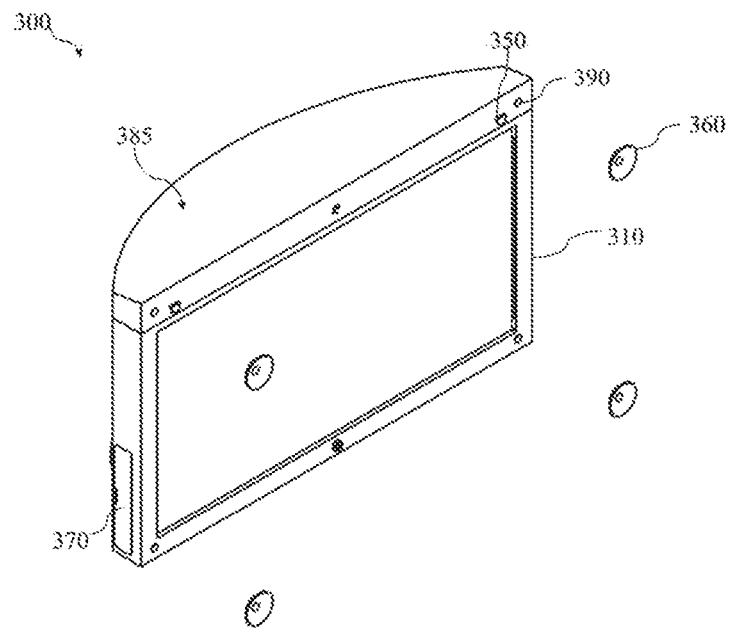
FIG. 10 is an exploded view of the illuminated address sign assembly of FIG. 9, according to some embodiments.
Figure 11:
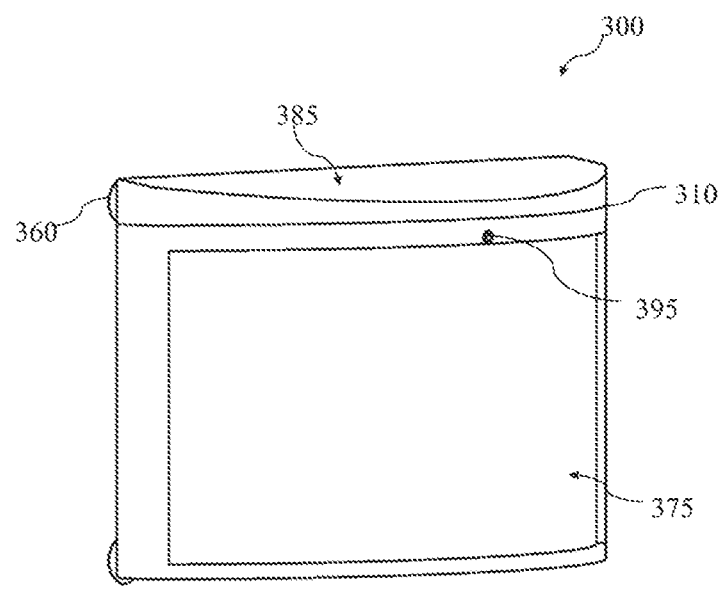
FIG. 11 is a front perspective view of the illuminated address sign assembly of FIG. 9, according to some embodiments.
Figure 12:
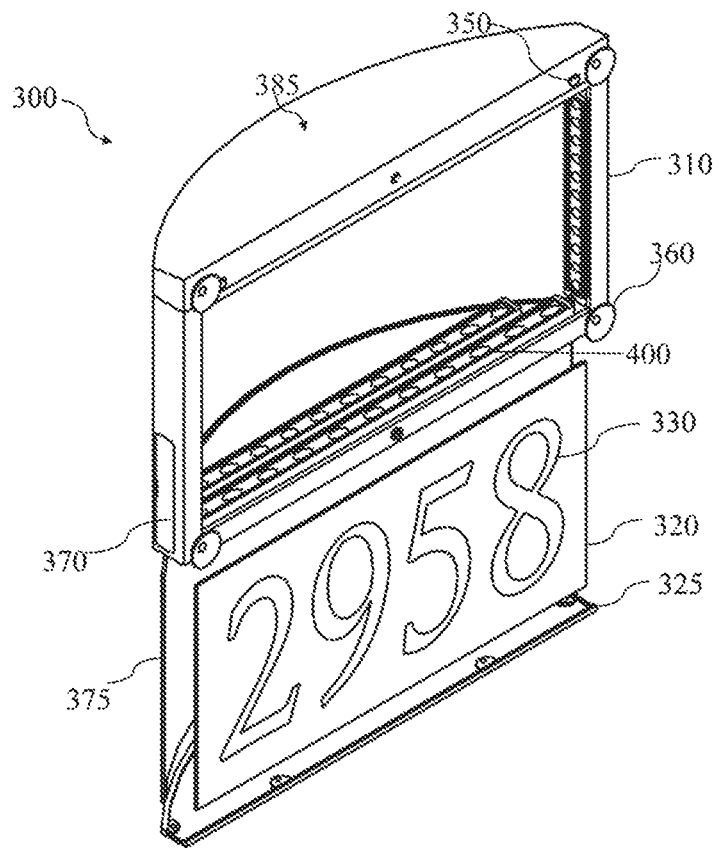
FIG. 12 is an exploded view of the illuminated address sign assembly of FIG. 9, according to some embodiments.
Figure 13:
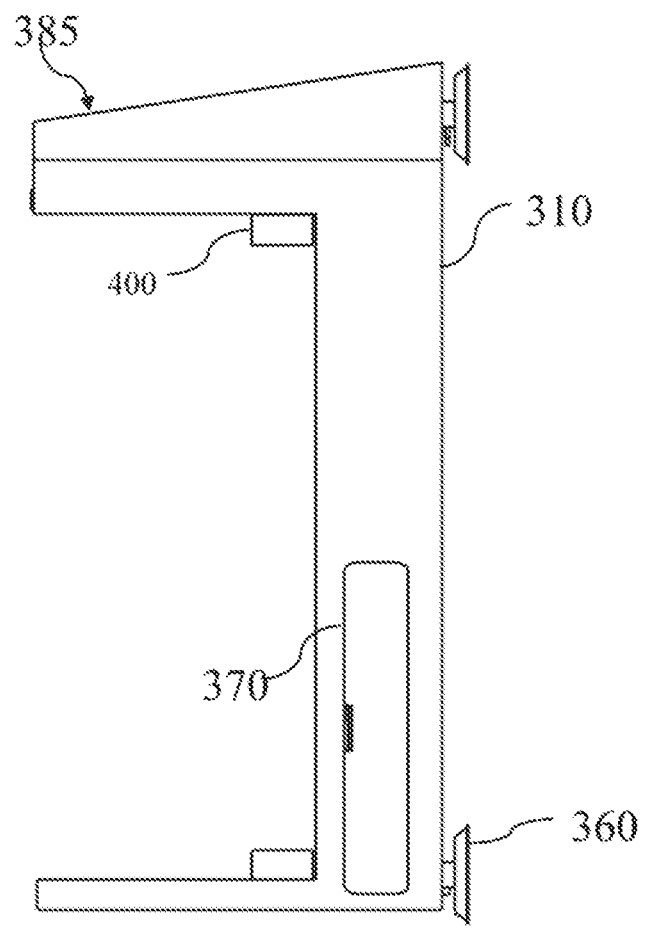
FIG. 13 is a side view of the illuminated address sign assembly of FIG. 9, according to some embodiments.

FIGS. 8 to 13 shows one or more alternate embodiments. FIG. 8 shows a rear side of the illuminated address sign assembly, which is of a flat shape, as can be seen in FIG. 9 which is a rear perspective view of the illuminated address sign assembly 300. It can be seen in FIG. 9 that the rear side of the frame 310 can have a flat address plaque 320. The front side of the frame 310 is curved. An opaque indicia 330 can be superimposed on the translucent backlit panel. A light sensor 340 configured near the top-middle portion of the rear side of the frame. A pair of hooks 350 can be configured on the rear side of the frame 310. Four suction cups 360 can be seen coupled to four corners of the rear side of the frame 310. FIG. 10 shows an exploded view of the illuminated address sign assembly 300 showing the attachment points 390. The attachment points 390 can be coupled with the suction cups 360. The attachment points 390 allows the suction cups 360 to be removably coupled. For example, the suction cups 360 can be mounted to the attachment point 390 through a fastener, such as screws. FIG. 11 shows the front side of the illuminated address sign assembly 300 having a curved opaque plaque 375 coupled to the front side of the frame 310. The front side of the frame can also be provided with a light sensor 395. Light sensors can be provided on both sides of the frame, such as the user can easily interchange the two sides of the illuminated address sign assembly. For example, the address plaque can be applied to the front side only or both the front side and the rear sides can have the address plaque. FIG. 12 is an exploded view showing the frame 310, the top side of the frame 385, a pair of hooks 350 configured on the rear side of the frame 310, and a battery cover 370. Further can be seen in FIG. 12 is the address plaque 320 coupled on the rear side of the frame 310, the opaque plaque 375 coupled with the front side of the frame 310, a base bracket 325 coupled to the bottom side of the frame 310 for securing the address plaque and the opaque plaque 375.

The illuminated address sign assembly according to the embodiments has an advantage providing an option to use the illuminated address sign assembly in different combinations. Either the front side or the rear side of the frame can receive the address plaque, and in addition both the front side and the rear side of the frame can receive the address plaque. However, because the front side of the frame can preferably of a curved shape. The front curved side of the frame can receive only a curved address plaque, while the flat rear side can receive a flat address plaque. Similarly, the front curved side of the frame can receive a curved opaque plaque, while the flat rear side can receive a flat opaque plaque. The illuminated address sign assembly can be provided with both the curved and flat address plaques and opaque plaques. Thus, the user can simply configure the illuminated address sign assembly with different options, such as both sides can have the address plaque. FIG. 8-13 shows one such embodiment, wherein the front side of the frame can have a curved opaque plaque, while the flat address plaque can be coupled to the rear side of the frame. Furthermore, the rear side of the frame can be provided with suction cups that can allow mounting the illuminated address sign assembly to a glass surface. Suitable attachment points can be provided along with the hooks on the rear side of the illuminated address sign assembly. These attachment points can be used to couple the suction cups. This embodiment allows the illuminated address sign assembly to be mounted from inside of the glass window, glass door, or a glass wall through the suction cups. It may be desired to mount the illuminated address sign assembly from inside the glass window. Here the user can simply replace the opaque plaque from the rear side of the frame with the address plaque and couple the four suction cups. Thereafter, the unit can be mounted to the glass pane through the suction cups. Moreover, the front side of the illuminated address sign assembly can also be provided with the address plaque, thus the address can be visible on both sides.

Figure 14:
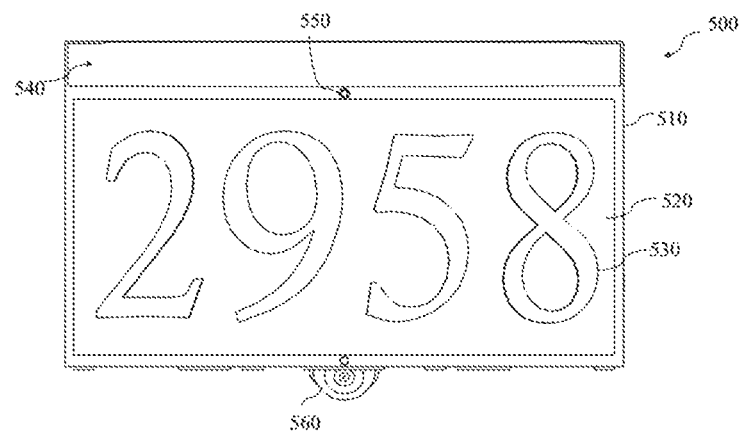
FIG. 14 shows the illuminated address sign assembly mounted to a letter-box pole, according to some embodiments.
Figure 15:
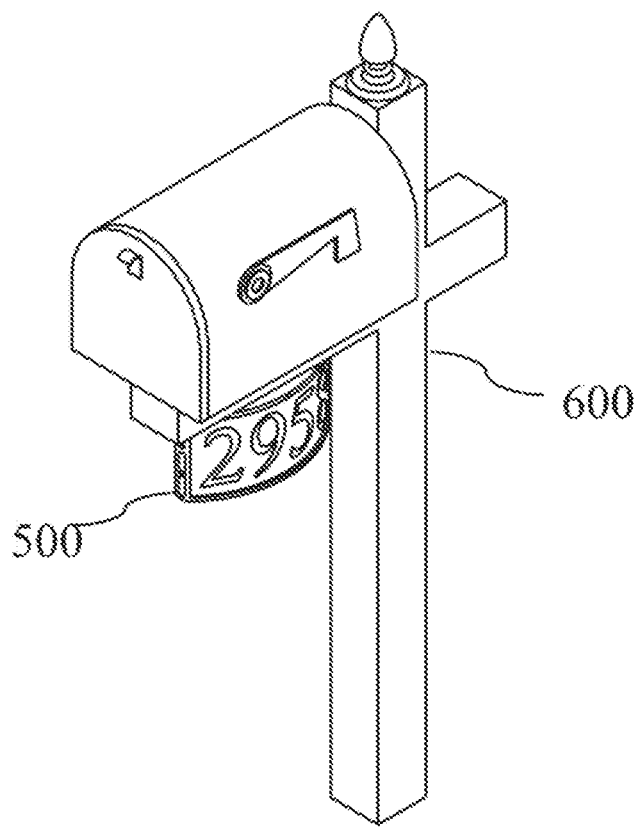
FIG. 15 is a front face of the illuminated address sign assembly having a camera, according to some embodiments.

FIG. 14 shows another embodiment, wherein the illuminated address sign assembly 500 can be provided with additional security features. Particularly, FIG. 14 shows a camera 560 mounted to the bottom side of the frame 510. FIG. 14 shows the front side of the illuminated address sign assembly 500 having the address plaque 520. The address plaque 520 having an opaque indicia 530 representing the address. FIG. 15 shows the illuminated address sign assembly of FIG. 14 mounted to letter-box pole 600. The illuminated address sign assembly 500 mounted to the letter-box pole 600 can be provided with an address plaque on both sides i.e., both the front side and the rear side of the frame.

The camera can be preferably a two-way camera mounted on the bottom side of the frame with additional motion-sensing functionality. The camera provides an additional security feature to the illuminated address sign assembly. The camera can be coupled to the control unit of the illuminated address sign assembly and configured to detect any motion within the field of the camera. The output from the camera can be transmitted to a remote device through the control unit. The output of the camera can also be recorded to a device wire or wirelessly coupled to the control unit. For example, the control unit can be coupled to a remote device through a Wi-Fi network for recording the output of the camera. The camera can be further controlled remotely through a remote device, such as an intercom unit installed in the house or a smartphone. The illuminated address sign assembly can also be provided with a microphone 540 and a speaker 550, such as to provide an intercom facility, wherein a visitor can be interviewed through the illuminated address sign assembly. Furthermore, the illuminated address sign assembly can detect any unwanted presence of a person nearby the illuminated address sign assembly, and accordingly triggers an alarm to a concerned person. The illuminated address sign assembly can be further provided with a solar panel for powering the control unit and the camera. Preferably, the solar panel can be mounted on the top side of the illuminated address sign assembly.

Figure 16:
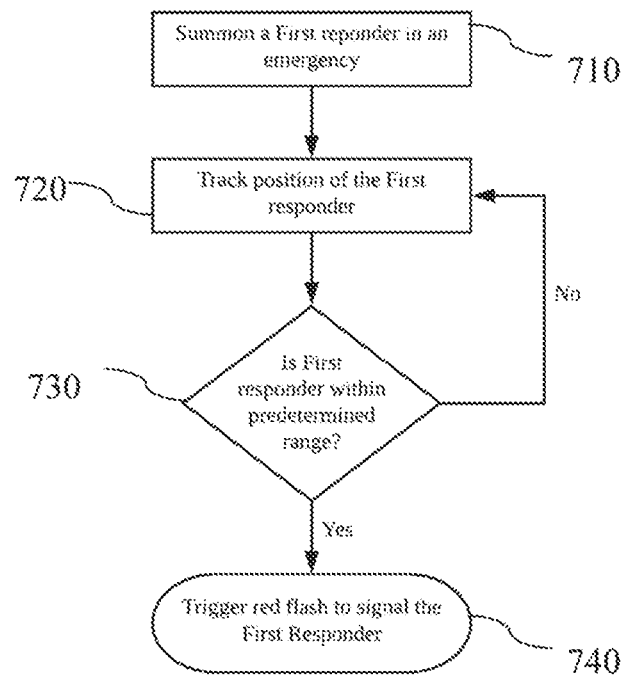
FIG. 16 is a flow chart showing a method of signaling a first responder, according to some embodiments.

FIG. 16 shows one embodiment where the illuminated address sign assembly can be used to signal a service provider heading to the building. The service provider can be a first responder in an emergency, ambulance, firefighters, an opted-in delivery company, and like. Signaling the service provider can reduce the time of the service provider in finding the desired address. Thus, any wastage of time in locating the correct address can be checked, which is particularly desired in an emergency. FIG. 16 shows a method for signaling a first responder who was summoned for an emergency. The first responder can be summoned about the emergency at step 710. In response, the emergency service provider can share a unique ID or a tag, which allows tracking the position of the first responder. At step 720, the illuminated address sign assembly can track the position of the first responder. At step 730, the illuminated address sign assembly can determine if the first responder is within the predetermined range, for example within 0.25 miles from the illuminated address sign assembly. In case the first responder can be located within the predetermined range, in block 740 the illuminated address sign assembly can trigger the red LED flashing to signal the first responder.

Figure 17:
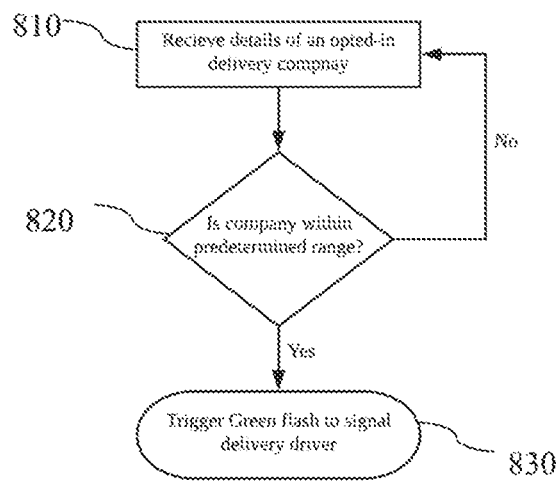
FIG. 17 is a flow chart showing a method of signaling an opted-in delivery company, according to some embodiments.

FIG. 17 shows another embodiment for signaling an opted-in delivery company. A delivery company that associates with the illumination address sign assembly has been referred herein as an opted-in delivery company. At step 810, details of the opted-in delivery system can be determined. Thereafter, at step 820 it can be determined if the opted-in delivery company has arrived within the predetermined range. Upon the arrival of the opted-in delivery company within the predetermined range, in block 830 the illumination address sign assembly can trigger a flashing of a predetermined light source 400. For example, the Green light source 400 can be flashed to signal the delivery vehicle.

A mapping device comprised of a microcontroller unit, a communication module, data storage memory and a global positioning system receiver is disclosed that provides data transfer through an internet cloud based connection to both a customer interface device as well as a separate physical server. The mapping device processes and stores the data and has access to the transferred data and other data stored on the physical server and customer interface device. The data transfer can include the geo location data of the mapping device that utilizes satellite global positioning system to determine geo location of the device. The data transfer can also include geofencing around the mapping device location. The data transfer can also include indication of penetration of geofencing borders by third-parties. The data transfer can also include typical user information such as but not limited to name, address, phone number, email address, user system preferences, customer number, and the like. The data transfer can occur not only between the mapping device and a customer interface device or physical server, but also between the customer interface device and the physical server through internet cloud connection, as well as, between the physical server through the internet cloud connection to third party interface devices or third party physical servers.

A system as described wherein the customer interface device includes but is not limited to a mobile phone, computing pad, or mobile computer. A system as described wherein the data transfer through an internet cloud-based connection can be via BLUETOOTH®, Wi-Fi, ZIGBEE®, cellular, or other similar wireless connections. A system as described wherein the third parties include but are not limited to shipping delivery services, emergency medical services (EMS) providers, user's guests, and other parties defined by the user.

Figure 18:
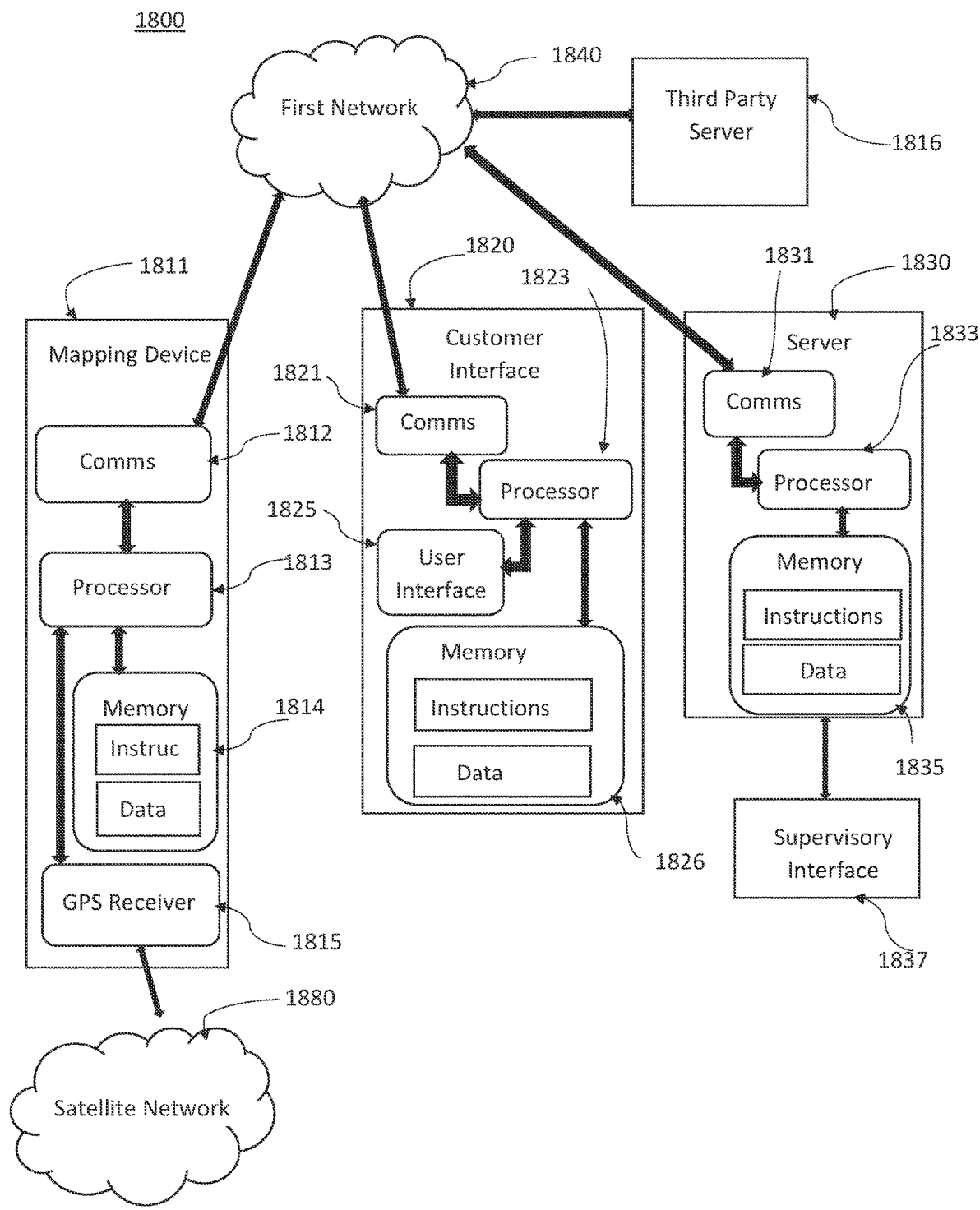
FIG. 18 illustrates a block diagram of a system for providing location of an automatic mapping device, according to some embodiments.

FIG. 18 illustrates a block diagram of a system 1800 for providing location of an automatic mapping device 1811, according to some embodiments. In some embodiments, the mapping device 1811 includes one or more communication components or modules (or comms) 1812 for transfer data via a first network 1840 (e.g., local area network (LAN), Internet, wide area network (WAN), metropolitan area network (MAN), personal area network (PAN), virtual area network (VLAN), wireless LAN (WLAN), etc.). In one or more embodiments, the data may be transferred through Wi-Fi, BLUETOOTH®, ZIGBEE®, near-field communications (NFC), cellular data network, etc. In some embodiments, the mapping device 1811 includes one or more processor modules 1813 that includes one or more processors, such as microprocessor(s), computer(s), etc., that is configured to receive data and process data from the communication module 1812 as well as to receive data from a GPS receiver 1815. In one or more embodiments, the GPS receiver 1815 is configured to receive data from at least one satellite network 1880 and transfer that data to the one or more processor modules 1813. In some embodiments, the mapping device 1811 includes a memory (or memory storage module) 1814 (e.g., machine-readable storage, such as read-only memory (ROM), flash memory, dynamic random access memory (DRAM) such as synchronous DRAM (SDRAM), a static memory (e.g., flash memory, static random access memory (SRAM)), etc.) for storing data and instructions for performing the various actions of the mapping device 1811 for execution by the one or more processor modules 1813. The mapping device 1811 may be powered by a direct line (e.g., AC, DC, etc.), with a disposable battery or batteries, with a rechargeable battery or batteries that are either removed from the mapping device 1811 and placed in a charger, or a charger may be plugged into the mapping device 1811 to recharge the battery or batteries, etc. If the battery or batteries are removed from the mapping device 1811 for recharging, a second battery or second set of batteries may be supplied to continue powering the mapping device 1811 during recharging of the initial battery or batteries. The mapping device 1811 may also include a solar electric panel or solar cell that converts light into electricity to recharge the battery or batteries. In some embodiments, the mapping device 1811 is connected to or with an address sign assembly, a physical door, a window, a portable hand-held device, etc.

In some embodiments, the system 1800 includes a customer interface 1820 including one or more communication modules (or comms) 1821 configured to send commands to the mapping device 1811 and receive and send data related to the system 1800. The customer interface 1820 may include one or more processing modules 1823 including one or more processors, such as a microprocessor(s), computer (s), etc., that is/are configured to receive data and process data from the one or more communication modules 1821, as well as from memory 1826 (e.g., machine-readable storage, such as ROM, flash memory, DRAM and SDRAM, a static memory (e.g., flash memory, SRAM), etc.). The memory 1826 may include both instructions and data. The customer interface 1820 may include one or more communication modules 1821 that are configured for transferring data to and from a server 1830. The customer user interface 1820 includes a user interface 1825, which may be in the form of a video display (e.g., a liquid crystal display (LCD), LED, cathode ray tube (CRT), etc.), one or more input devices (e.g., a keyboard and/or a mouse or other pointing or input device), one or more speakers or transducers (e.g., an attached speaker, remote speaker, etc.), and one or more microphones (e.g., a directly or indirectly connected microphone). In one illustrative example, the customer interface 1820 may be both a display(s) and input device(s) that are combined into a single component or device (e.g., an LCD touch screen, etc.). In some embodiments, the customer interface 1820 may be a system such as a personal computer (PC), a tablet or pad computing device, a wearable (e.g., wristband, watch, pendant, etc.), a set-top box (STB), a personal Digital Assistant (PDA), a mobile phone, a camera, a video camera, or any device capable of executing a set of instructions (sequential or otherwise) that specify actions to be taken by that device. The customer interface 1820 may be powered by a direct line, with a disposable battery or batteries, with a rechargeable battery or batteries or the like, etc.

In one or more embodiments, the system 1800 includes the server 1830 that may take the form of a physical server, a distributed and/or virtualized computer or computers (e.g., a cloud computing platform, etc.). In some embodiments, the server 1830 includes a communication interface (or comms) 1831 configured to communicate with the customer interface 1820 and the mapping device 1811 via the first network 1840. In some embodiments, the first network 1840 may include wired and/or wireless network connections, such as Wi-Fi, BLUETOOTH®, ZIGBEE®, NFC, cellular data network, etc. The server 1830 includes a processor module 1833 and a memory 1835 (e.g., machine-readable storage, such as ROM, flash memory, DRAM, SDRAM, a static memory (e.g., flash memory, SRAM), etc.), that holds instructions for performing the various actions of the server 1830 for execution by the processor module 1833. The processor module 1833 may represent one or more general-purpose processing devices, such as a microprocessor, central processing unit (CPU), etc. In some embodiments, the processor module 1833 may be a complex instruction set computing (CISC) microprocessor, reduced instruction set computing (RISC) microprocessor, very long instruction word (VLIW) microprocessor, a processor implementing other instruction sets or processors implementing a combination of instruction sets, etc. In one or more embodiments, the processor module 1833 may be one or more special-purpose processing devices, such as an application specific integrated circuit (ASIC), a field programmable gate array (FPGA), a digital signal processor (DSP), network processor, etc. The processor module 1833 is configured to execute instructions for performing any of the operations and steps discussed herein. The memory 1835 can take the form of any type of machine-readable storage memory, which communicate with each other via a bus. While the memory 1835 is shown in the illustrative examples to be a single medium, the term "memory" should be taken to include a single medium or multiple media (e.g., a centralized or distributed database, and/or associated caches and servers) that store the one or more sets of instructions. The term "memory" shall also be taken to include any medium that is capable of storing, encoding or carrying a set of instructions for execution by the machine and that cause the machine to perform any one or more of the methodologies of the present disclosure. The term "memory" shall accordingly be taken to include, but not be limited to, solid-state memories, optical media, and magnetic media.

In some embodiments, the server 1830 may include one or more servers 1830 that form a distributed computing architecture. Each of the servers 1830 may include one or more processing modules 1833, memory 1835 devices, data storage, and/or network interface cards. The servers 1830 may be in communication with one another via any suitable communication protocol using one or more communication interfaces (or comms) 1831.

In one or more embodiments, the server 1830 may include a supervisory interface 1837. The supervisory interface 1837 may include a video display (e.g., an LCD, LED, CRT, etc.), one or more input devices (e.g., a keyboard and/or a mouse or other pointing device, etc.), and one or more speakers or transducer (e.g., an attached speaker, remote speaker, etc.). In one illustrative example, the video display and the input device(s) may be combined into a single component or device (e.g., an LCD touch screen, computing pad or tablet, etc.). The supervisory interface 1837 may be used to upload information to the memory 1835 or to retrieve data from memory 1835. The supervisory interface 1837 may be used to update or modify instructions sored in memory 1835 executed by the processor module 1833 or to review instructions previously executed by processor module 1833 that have been stored in memory 1835.

In some embodiments, the automated mapping system 1800 may be connected via the first network 1840 to a third party server 1816. The first network 1840 may be a public network (e.g., connected to the Internet via wired (Ethernet) or wireless (Wi-Fi)), a private network (e.g., PAN, LAN, VLAN, WLAN, WAN, MAN, etc.), or a combination thereof. The third party server 1816 may be configured to conduct a variety of processes including but not limited to, updating the geolocation of an address associated with the mapping device 1811 on the third party server 1816 mapping database. For example, the third party server 1816 may be a commercially available mapping system that is commonly used by consumers and businesses to locate an address. Additionally, the third party server 1816 may be a private mapping system that is commonly used by a business to allow their employees to locate an address. These businesses may include, but are not limited to, a delivery service, a car share service, a car ride service, an emergency service such as a police or sheriff's department, a fire department, an ambulance service, etc. It should be appreciated that using the automated mapping system 1800 to update the location of an address associated with a mapping device 1811 is extremely helpful in enabling business services, emergency response services, and friends and family of the customer or business owner at that address in physically locating the address. This can be particularly beneficial in ensuring timely and accurate delivery in locations that are not easily identified and are distinct, such as but not limited to apartment buildings, shopping centers, gated complexes, rural areas, offices and the like.

Figure 19:
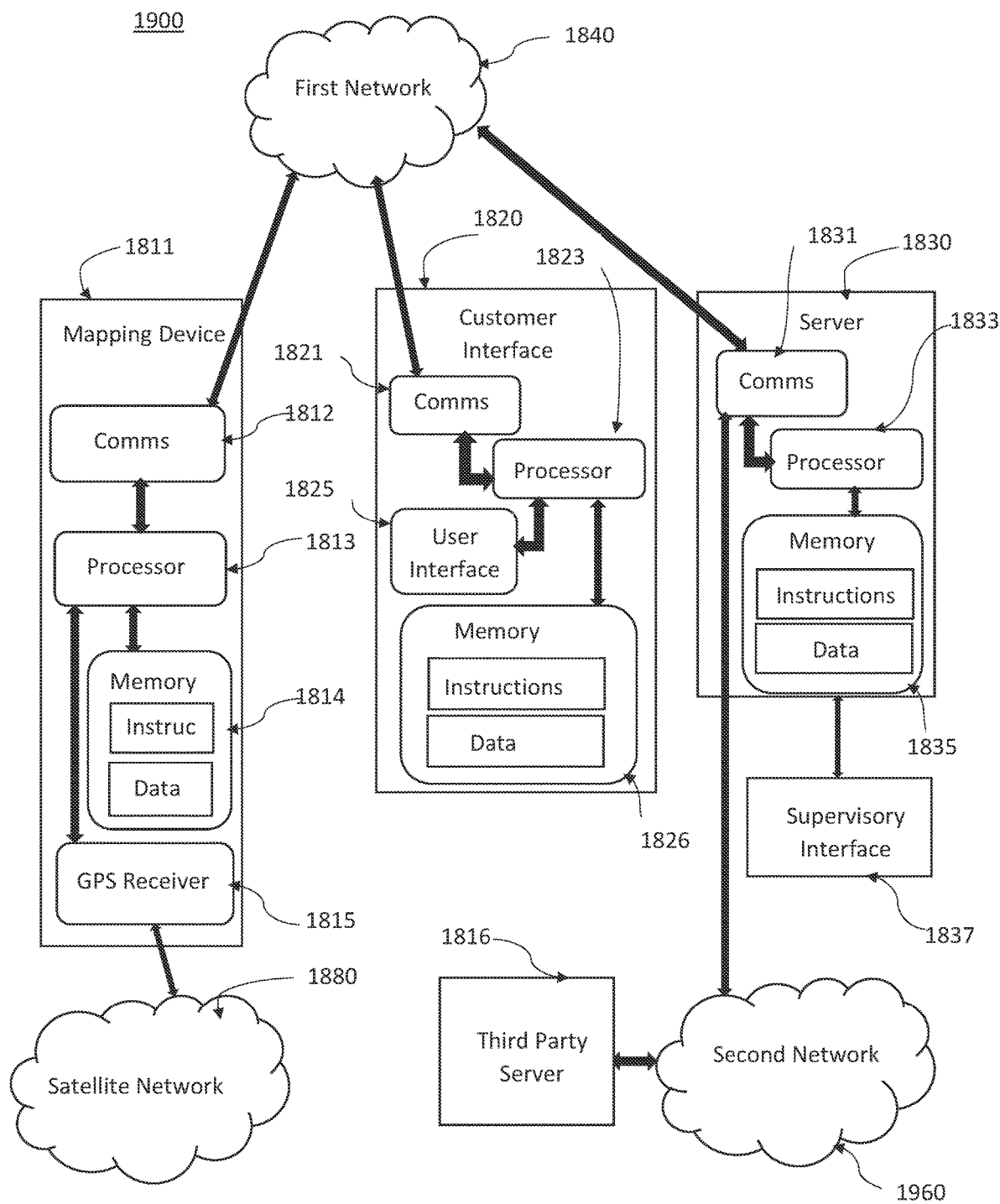
FIG. 19 illustrates a block diagram of another system for providing location of an automatic mapping device, according to some embodiments.

FIG. 19 illustrates a block diagram of another system 1900 for providing location for the automatic mapping device 1811, according to some embodiments. In one embodiment, system 1900 includes all the elements described in system 1800 (FIG. 18). In addition, in one embodiment the server 1830 communicates with a third party server 1816 through at least a second network 1960. The second network 1960 may be a public network (e.g., connected to the Internet via wired (Ethernet) or wireless (Wi-Fi)), a private network (e.g., a PAN, LAN, VLAN, MAN, WAN, WLAN, etc., or a combination thereof). Not only can the server 1830 communicate through a second network 1960 to the third party server 1816, but also the customer interface 1820 or the mapping device 1811 may communicate to the server 1830 through the second network 1960.

Figure 20:
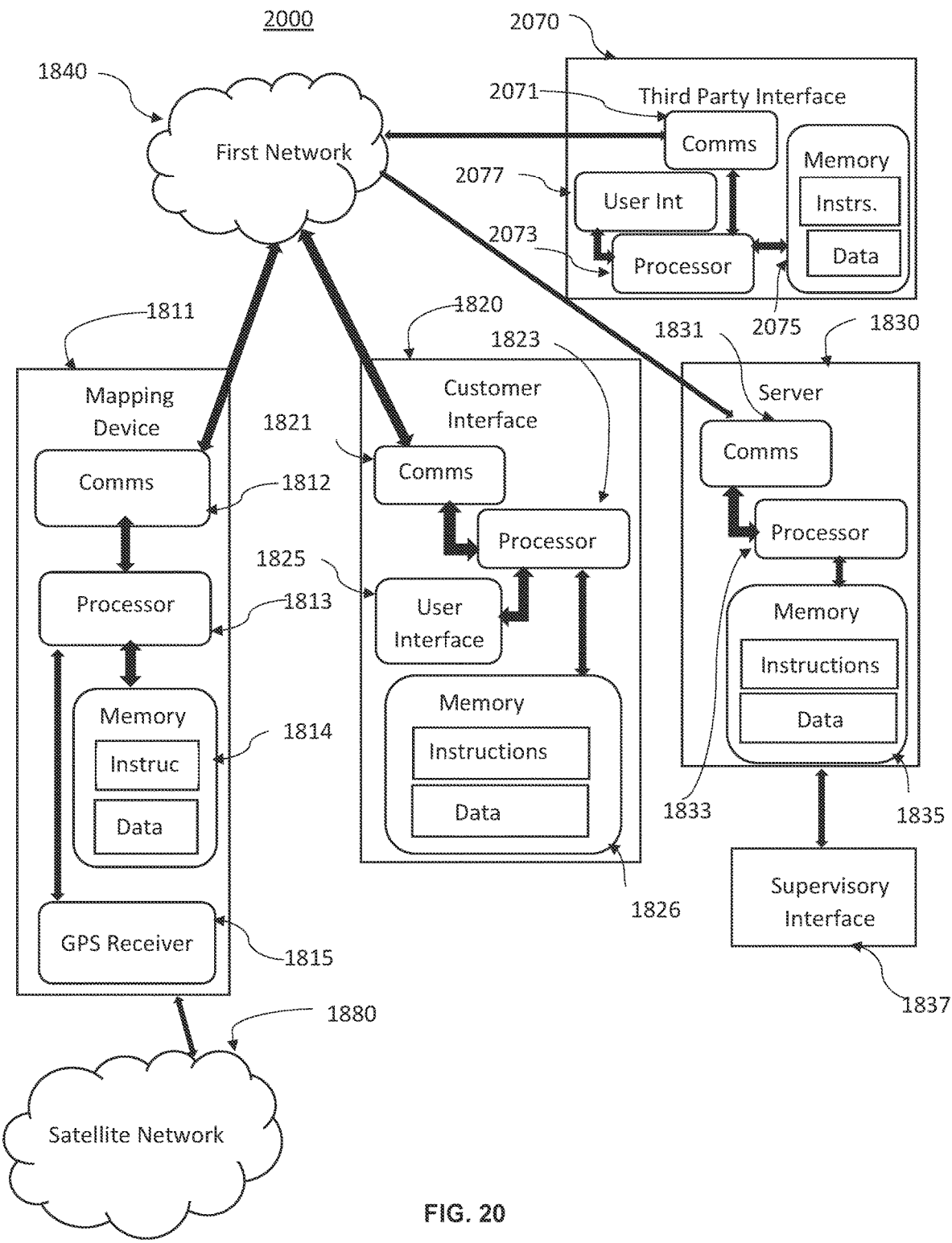
FIG. 20 illustrates a block diagram of yet another system for providing location of automatic device mapping that interfaces with another third-party device, according to some embodiments.

FIG. 20 illustrates a block diagram of yet another system 2000 for providing location of the automatic mapping device 1811 that interfaces with another third party interface device 2070, according to some embodiments. In one embodiment, system 2000 includes all the elements described in system 1800 (FIG. 18). In addition, in one embodiment the server 1830, the mapping device 1811 and the customer interface 1820 may each communicate to a third party interface 2070 through the first network 1840. In some embodiments, the third party interface 2070 includes one or more communication modules (or comms) 2071 configured to send commands to the first network 1840, and receive and send data related to the automated mapping system 2000. The third party interface 2070 may include one or more processing modules 2073 such as a microprocessor or computer configured to receive data and process data from the communication module 2071 as well as from memory 2075 (e.g., machine-readable storage, such as ROM, flash memory, DRAM and SDRAM, a static memory (e.g., flash memory, SRAM), etc.). The memory 2075 may include both instructions and data. The third party interface's 2070 one or more communication modules 2071 are also configured for transferring data to and from the server 1830. In some embodiments, the third party interface 2070 includes a user interface 2077, which may be in the form of a video display (e.g., LCD, CRT, LED, etc.), one or more input devices (e.g., a keyboard and/or a mouse or other pointing device, etc.), one or more speakers or transducers (e.g., an attached speaker, remote speaker, etc.), and one or more microphones (e.g., a directly or indirectly connected microphone). In one illustrative example, the third party interface 2070 may be both a display(s) and input device(s) that are combined into a single component or device (e.g., an LCD or LED touch screen, computing tablet or pad, etc.). The third party interface 2070 may be a PC, a tablet computer, a wearable (e.g., wristband, watch, pendant, etc.), an STB, a PDA, a mobile phone, a camera, a video camera, or any device capable of executing a set of instructions (sequential or otherwise) that specify actions to be taken by that device. The third party interface 2070 may also include a GPS receiver (not shown) that is configured to receive data from at least one satellite network 1880 and transfer that data to the processing module 2073.

In some embodiments, the third party interface 2070 may be used by any number of potential third parties to interact with the automated mapping system 2000. These may include, but are not limited to, friends and family, a delivery service, and emergency response service or the like of the owner of the mapping device 1811 who are interested in locating the address associated with the mapping device 1811. The third party interface 2070 may be used to communicate with the automated mapping system 2000 in order to locate the address associated with the mapping device 1811. The third party interface 2070 may also be used to request direction to the address associated with the mapping device 1811.

Figure 21:
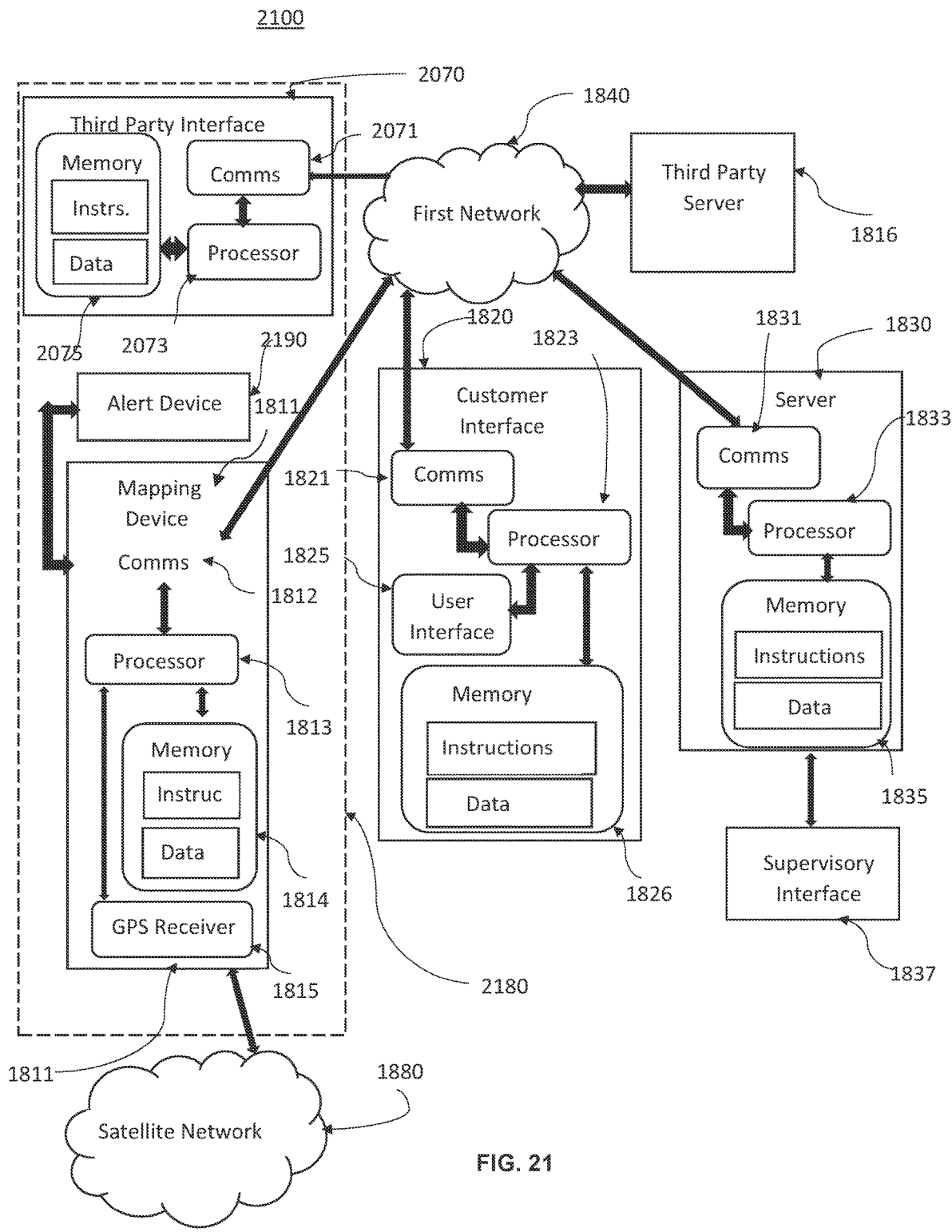
FIG. 21 illustrates a block diagram of still another system for providing location of an automatic mapping device and that detects the proximity of another third-party device, according to some embodiments.

FIG. 21 illustrates a block diagram of still another system 2100 for providing location of the automatic mapping device 1811 and that detects the proximity of another third-party device, according to some embodiments. In one embodiment, the system 2100 includes all the elements described regarding system 1800 (FIG. 18). In one or more embodiments, the server 1830, the mapping device 1811 and the customer interface 1820 may all communicate to either the third party interface 2070 or a third party server 1816 through the first network 1840. In one example, the third party interface 2070 requests directions to the address associated with the mapping device 1811 through either the third party server 1816 or the server 1830. After the server 1830 or third party server 1816 has generated and communicated those directions, as described herein, the third party server 1816 or the server 1830 communicates the transmission of the directions to the customer interface 1820 and to the mapping device 1811. The mapping device 1811 then enables a geofencing feature 2180 associated with the mapping device 1811. The geofencing feature 2180 is a virtual perimeter around the mapping device 1811 that may be configured by the customer interface 1820. For example, the owner of the mapping device 1811 may live in a rural area and desires a geofencing perimeter 2180 of a quarter of a mile around the mapping device 1811. Alternatively, the owner of the mapping device 1811 may be a business in a shopping center and may want a geofencing perimeter 2180 around the mapping device 1811 of 500 feet. In either case, the mapping device 1811 enables a geofencing perimeter 2180 and is in communication with at least one of a customer interface 1820, a server 1830, or a third party server 1816 through the first network 1840. The customer interface 1820, server 1830, or third party server 1816 is also in communication with the third party interface 2070 through the first network 1840. The geolocation of the third party interface 2070 is communicated through the first network 1840 to the customer interface 1820, server 1830, or third party server 1816 such that when the geolocation breaches the geofencing perimeter 2180 the mapping device 1811 is notified by either the customer interface 1820, server 1830, or third party server 1816. The mapping device 1811 may then enable the appropriate alert device 2190. In some embodiments, the geofencing perimeter 2180 may be adjusted or based on traffic flow information at or near the destination location. In these embodiments, the geofencing perimeter 2180 may be adjusted up or down depending on real-time traffic and street/location information that affects the traffic flow (e.g., traffic conditions, construction activities (e.g., street repair, building construction, etc.), social activities (e.g., large gatherings, events, etc.), parking conditions, etc.). In one example embodiment, a business/ residence on a street with traffic flow of 45 MPH may need a larger geofencing perimeter (e.g., 1000 feet) than a business/residence on a street where the traffic flow averages about 25 MPH, which may need a smaller geofencing perimeter (e.g., 600 feet). In another example, construction activity on a destination street may affect traffic by having limited traffic (e.g., traffic flag personnel controlling traffic in an alternating fashion, reduced traffic lanes, etc.). In one or more embodiments, other activities, conditions, events, etc. may contribute to adjusting the geofencing perimeter 2180, such as weather conditions (e.g., fog, rain, snow, icy conditions, etc.).

In one or more embodiments, the alert device 2190 may be one or more of the following: steady light(s), flashing light(s), an audible alarm, access of or activation of a video camera, an audible pre-recorded greeting, activation of a speaker, activation of a microphone, activation of a video monitor, sending of a text message or email alert, etc. For example, if the third party interface 2070 is a delivery driver's device, the alert device 2190 may be both a steady light that illuminates an address number and or name on the mapping device 1811 as well as a row of, for example, green flashing lights on the mapping device 1811. In another example, if the third party interface 2070 is an emergency response driver's device, the alert device 2190 may be a row of, for example, red flashing lights and an audible alarm. In some embodiments, the mapping device 1811 provides visual, auditory signals, or both thereof to the owner of the third party interface 2070 to alert the owner that they are close to or have reached their destination. It can be appreciated that this type of direction service and alert service provided by the mapping device 1811 through the automated mapping system 2100 enables third parties trying to locate the address associated with the mapping device 1811.

In one or more embodiments, in addition to enabling alert device(s) 2190 when a third party interface 2070 breaches a geofencing perimeter 2180 after the third party interface 2070 was provided location directions to the mapping device 1811, the mapping device 1811 may notify a customer interface 1820 that the third party interface 2070 has breached the geofencing perimeter 2180. This notification may assist the owner of the mapping device 1811 with information about the arrival of visitors, customer, emergency management services, delivery services and the like. If the mapping device 1811 enables a video camera after the geofencing perimeter 2180 is breached, the owner of the customer interface 1820 can watch the arrival of the third party interface 2070 through the user interface 1825 located on the customer interface 1820. The owner of the mapping device 1811 may want to give verbal instructions to the user of the third party interface 2070 even if the owner is not physically present at the location of the mapping device 1811. In this case, the owner of the mapping device 1811 could use a microphone as part of the user interface 1825 on the customer interface 1820 to greet the user of the third party interface 2070 through a speaker on the mapping device 1811. The owner of the mapping device 1811 may want to communicate to a delivery service information regarding where to leave a package. The owner of the mapping device 1811 may want to communicate to an emergency response location the exact or updated location or updated condition of the person or situation needing emergency response.

In some embodiments, in the automated mapping system 2100 the customer interface 1820 may be a cell phone that is used to contact emergency response services. The customer interface 1820 may automatically detect that the customer used the customer interface 1820 to request an emergency response, and if the customer interface 1820 is located near the mapping device 1811, the customer interface 1820 may automatically enable the geofencing perimeter 2180 on the mapping device 1811 to help guide the emergency response to the customer interface 1820 location. This is important as the customer may be injured or have limited function, such that automatically enabling the geofencing perimeter 2180 (and the features described herein that pertain to the activated geofencing perimeter 2180) may be a life-saving feature for the customer.

In one or more embodiments, the mapping device 1811 may be in communication directly with a third party interface device 2070 through the first network 1840 to generate directions, enable a geofencing perimeter 2180, and enable the alert device(s) 2190 without having to communicate through a customer interface 1820, the server 1830, or the third party server 1816.

Figure 22:
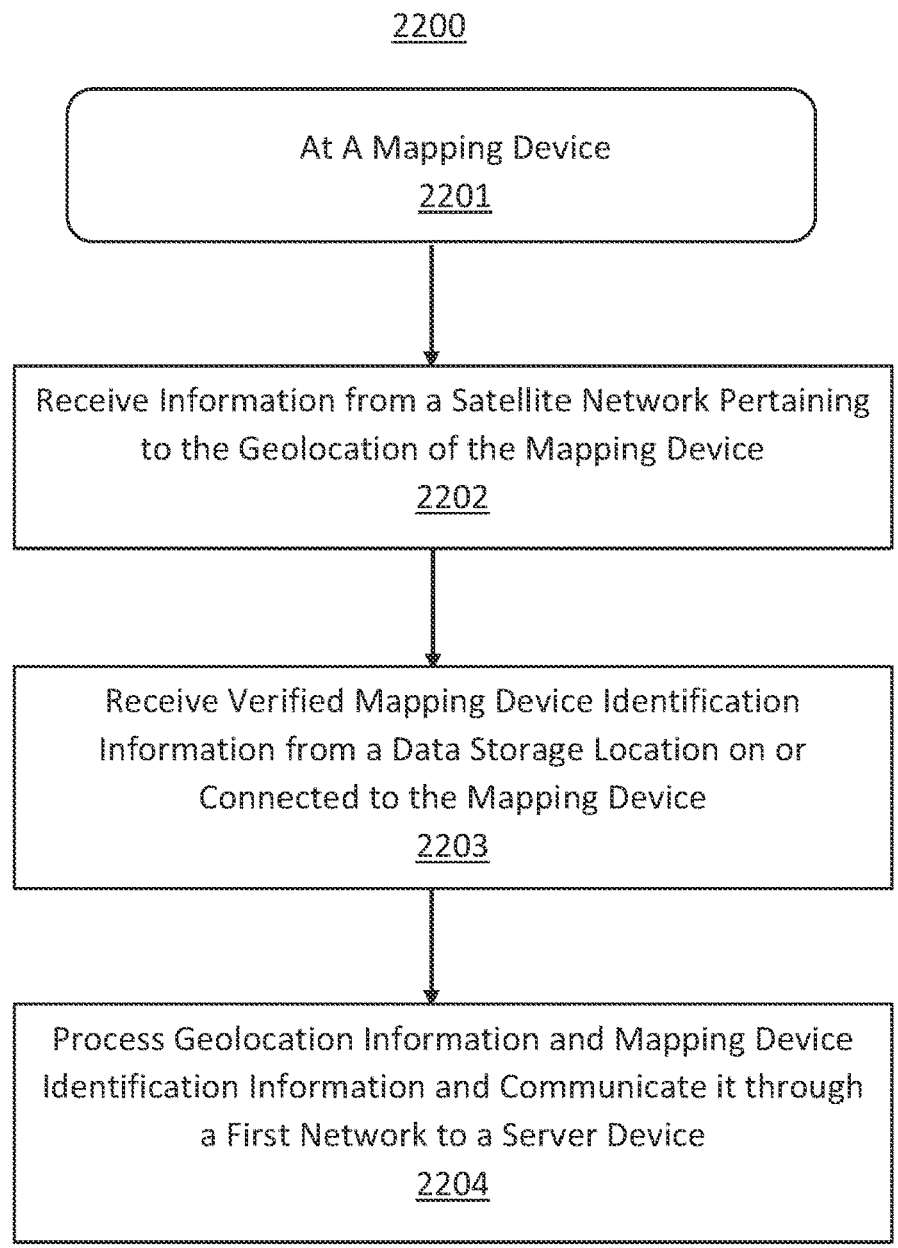
FIG. 22 shows an example process for processing and transmitting data from a mapping device to a server device, according to some embodiments.

FIG. 22 shows an example process 2200 for processing and transmitting data from a mapping device (e.g., mapping device 1811, FIGS. 18-21) to a server device (e.g., server 1830), according to some embodiments. In some embodiments, the process 2200 may be performed by processing logic that may include hardware (processor(s), circuitry, dedicated logic, etc.), software, or a combination of both. The process 2200 (and/or each of its individual functions, subroutines, operations, threads, etc.) may be performed by one or more processors of the mapping device 1811 (e.g., processor module 1813, FIGS. 18-21) implementing the process 2200. In one or more embodiments, the process 2200 may be performed by a single processing thread. Alternatively, the process 2200 may be performed by two or more processing threads, each thread implementing one or more individual functions, routines, subroutines, or operations of the processing of process 2200.

In some embodiments, at block 2201, processing for process 2200 begins at a mapping device (e.g., mapping device 1811, FIGS. 18-21). At block 2202 the process 2200 provides that the mapping device 1811 receives geolocation information on an internal or external GPS receiver (e.g., GPS receiver 1815, FIGS. 18-21) from a satellite network (e.g., satellite network 1880, FIGS. 18-21) regarding the geolocation of the mapping device 1811. In block 2203, process 2200 provides that the mapping device 1811 retrieves a verified and unique identification information that is stored on either internal or external memory (e.g., memory 1814, FIGS. 18-21). In block 2204, process 2200 processes the geolocation information and unique identification information (e.g., via processor module 1813) transmitted through a network (e.g., first network 1840, FIGS. 18-21) by a communication module (e.g., communication module 1812, FIGS. 18-21) to a server (e.g., server 1830, FIGS. 18-21)).

In some embodiments, for simplicity of explanation, the process 2200 is depicted and described as a series of operations. However, operations in accordance with this disclosure may occur in various orders and/or concurrently, and/or with other operations not presented and described herein. For example, the operations depicted in the process 2200 may occur in combination with any other operation of any other method disclosed herein. Furthermore, not all illustrated operations may be required to implement the process 2200 in accordance with the disclosed subject matter. In addition, those skilled in the art will understand and appreciate that the process 2200 could alternatively be represented as a series of interrelated states via a state diagram, a directed graph, a deterministic finite state automaton, a non-deterministic finite state automaton, a Markov diagram, or event diagrams.

Figure 23:
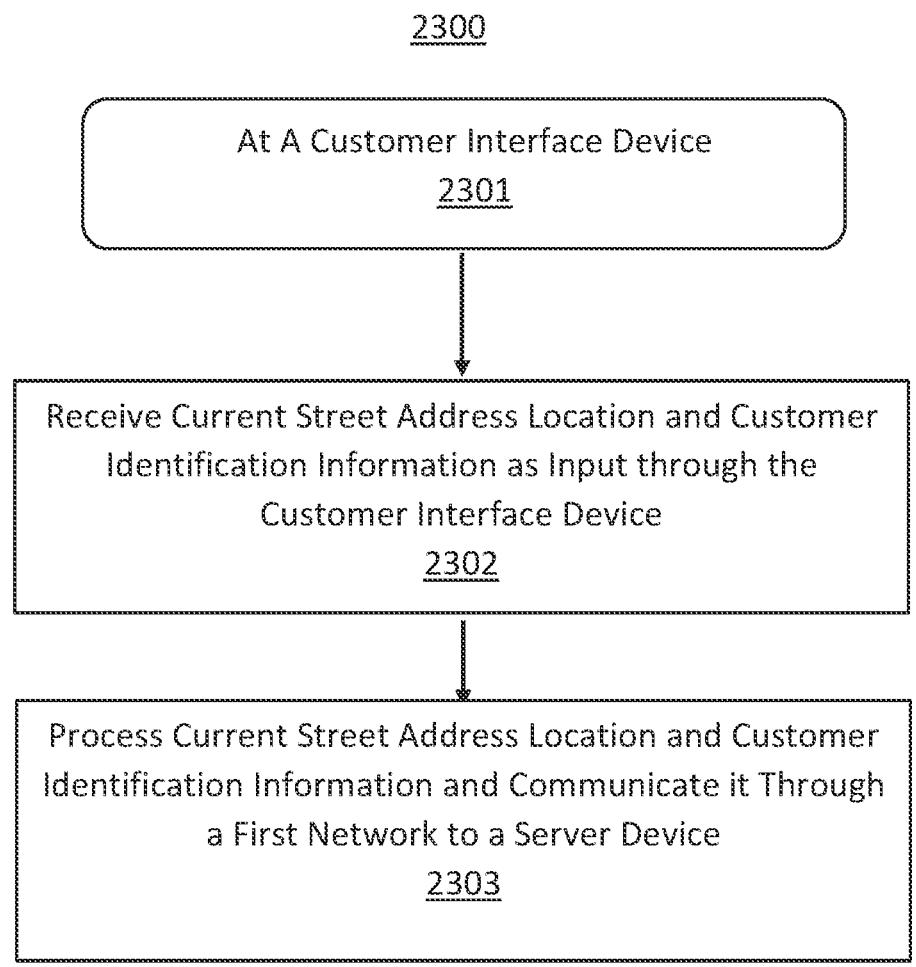
FIG. 23 shows an example process for processing and transmitting data from a customer interface device to a server device, according to some embodiments.

FIG. 23 shows an example process 2300 for processing and transmitting data from a customer interface device (e.g., customer interface device 1820, FIGS. 18-21) to a server device (e.g., server 1830, FIGS. 18-21), according to some embodiments. Process 2300 may be performed by processing logic that may include hardware (processor(s), circuitry, dedicated logic, etc.), software, or a combination thereof. Process 2300 and/or each of its individual functions, subroutines, operations, threads, etc. may be performed by one or more processors (e.g., processing module 1813) of a mapping device (e.g., mapping 1811) implementing the process 2300. The process 2300 may be performed by a single processing thread. Alternatively, process 2300 may be performed by two or more processing threads, each thread implementing one or more individual functions, routines, subroutines, or operations of the processing.

In one or more embodiments, at block 2301, process 2300 begins at a customer interface device (e.g., customer interface 1820, FIGS. 18-21). In block 2302, process 2300 provides that a communication module (e.g., communication module 1821, FIGS. 18-21) of the customer interface device receives current address information and customer identification information that is input by the customer on the customer interface device. The current address information may be input using a user interface (e.g., user interface 1825, FIGS. 18-21) in the standard form for addresses in that location, such as street number, street name, unit number, name of town, name of state or province, and the address code such as a zip code. The customer identification information may include customer first and last names, customer's mailing address, email address, phone number, password, unique identification number assigned to the customer at the time of purchase of the mapping device or assigned after purchase of the mapping device while registering the mapping device with the manufacturer, etc.

In some embodiments, at block 2303 process 2300 provides that the current address information and customer identification information are processed (e.g., via processor module 1823, FIGS. 18-21) and transmitted through a network (e.g., first network 1840, FIGS. 18-21) by a communication module (e.g., communication module 1821, FIGS. 18-21) of a customer interface (e.g., customer interface 1820, FIGS. 18-21) to a server (e.g., server 1830, FIGS. 18-21). Similarly, as described for process 2200 (FIG. 22), the operations depicted in process 2300 may occur in combination with any other operation of any other method disclosed herein. Furthermore, not all illustrated operations may be required to implement the process 2300 in accordance with the disclosed subject matter. In addition, those skilled in the art will understand and appreciate that the process 2300 could alternatively be represented as a series of interrelated states via a state diagram, a directed graph, a deterministic finite state automaton, a non-deterministic finite state automaton, a Markov diagram, or event diagrams.

Figure 24:
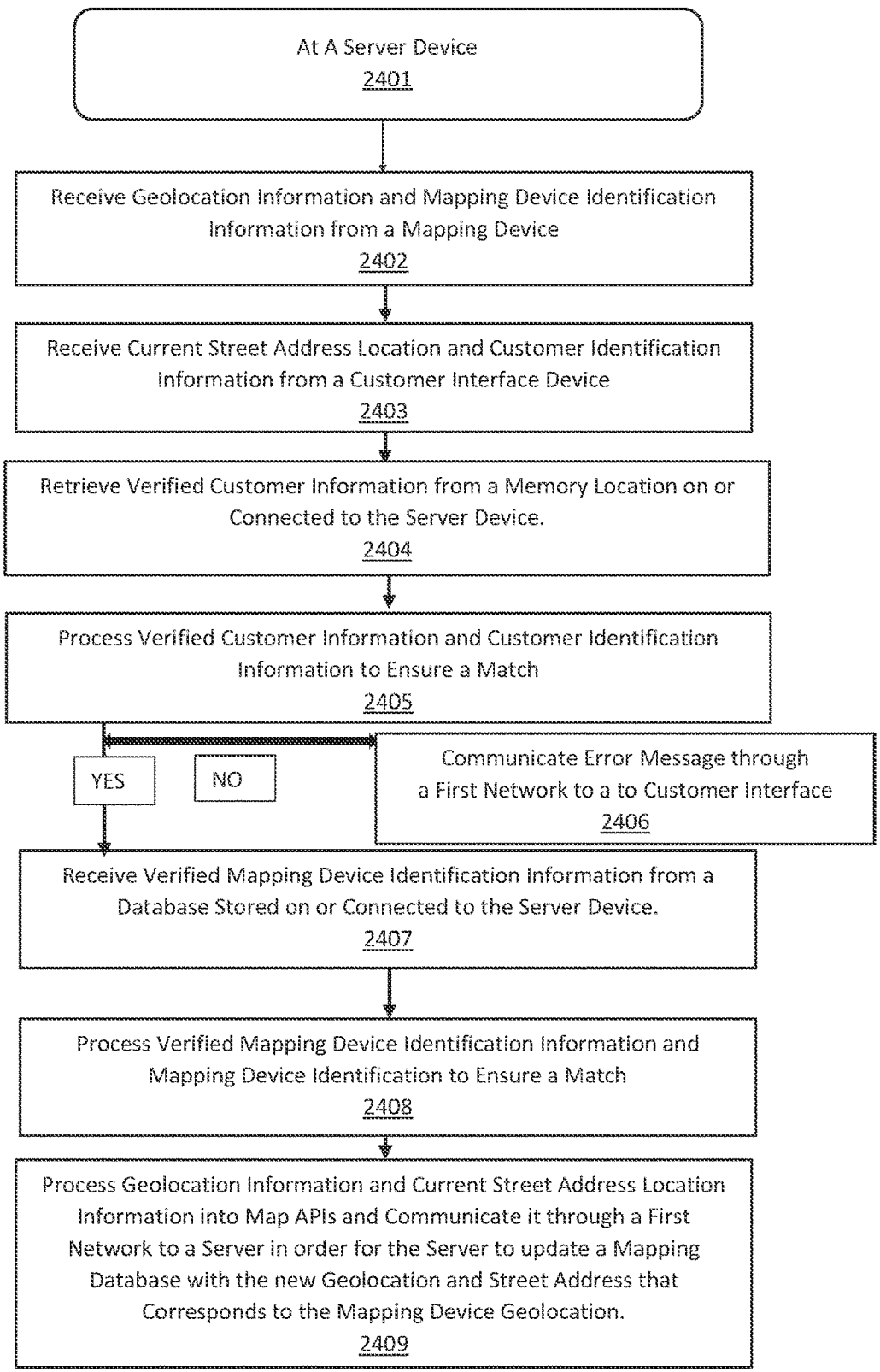
FIG. 24 shows an example process for processing and transmitting data from a server device to a third-party server device, according to some embodiments.

FIG. 24 shows an example process 2400 for processing and transmitting data from a server device (e.g., server device 1830, FIGS. 18-21) to a third-party server device (e.g., third party server 1816, FIGS. 18, 19 and 21), according to some embodiments. In some embodiments, at block 2401, processing for process 2400 begins at the server device. In block 2402, process 2400 provides that a communication module (e.g., the communication interface 1831, FIGS. 18-21) of the server device receives geolocation information and mapping device identification information from the mapping device (e.g., mapping device 1811, FIGS. 18-21) through a network (e.g., the first network 1840, FIGS. 18-21). In block 2403, process 2400 provides that the server receives current address information and customer identification information from a customer interface (e.g., the customer interface 1820, FIGS. 18-21) through a network (e.g., the first network 1840). In block 2404, process 2400 provides that the server retrieves verified customer information stored on a memory (e.g., memory 1835, FIGS. 18-21) location. In block 2405, process 2400 provides that a processor (e.g., via processor module 1833, FIGS. 18-21) on the server processes the verified customer information and the customer identification information to confirm they match. If a match is not confirmed, then process 2400 proceeds to block 2406 where process 2400 provides that a communication device (e.g., communication interface 1831) of the server device sends an error message to the customer interface. If a match is confirmed, then process 2400 proceeds to block 2407, where process 2400 provides that the server retrieves verification identification information from the mapping device that is stored on a memory location of the memory (e.g., memory 1835, FIGS. 18-21). In block 2408, process 2400 provides that the processor on the server processes the verified mapping device identification information and mapping device identification information to confirm they match. If a match is not confirmed, then the communication device of the server device sends an error message to the customer interface. If a match is confirmed, process 2400 proceeds to block 2409 where the processor on the server device processes the geolocation information and the current street address location information, and converts the combined information into map APIs. The communication device of the server device transmits the map APIs to the server (e.g., third party server 1816, FIGS. 18-19, 21) through the network (e.g., first network 1840, FIGS. 18-21) so that the third party server can update a mapping database with the new geolocation of the street address that corresponds to the geolocation of the mapping device. Alternately or additionally, the processor on the server device processes the map APIs to update the mapping database (e.g., via data storage on machine-readable storage memory 1835, FIGS. 18-21) with the new geolocation of the street address the corresponds to the geolocation of the mapping device.

In some embodiments, through a combination of the processes 2200, 2300 and 2400 described in FIGS. 22-24, the mapping device 1811, the customer interface 1820, and the server 1830 of the automated mapping system (e.g., system 1800) provide a new geolocation for any mapping database of the street address of the mapping device 1811. The automated mapping system may be used in this manner to correct address location errors stored in any mapping database through a network (e.g., the first network 1840, FIGS. 18-21, or the second network 1960, FIG. 19). The automated mapping system 1800 may also be used in this manner to improve the accuracy of address locations stored in any mapping database through a network (e.g., a first network 18 or the second network 1960).

In one or more embodiments, the processing for correcting address locations and/or improving the accuracy of address locations can be helpful in many different situations. For example, when trying to find a particular apartment in a large apartment complex, the apartment location in many mapping locations is shown as just the front door of the apartment building. The actual location of the individual apartment is often not designated with more precision than the front entrance. This can be of even more importance when there are numerous buildings in an apartment complex. Similarly, a shopping mall often shows every business address located in the mall at a single location when each individual business has its own unique location in the mall. Using an automated mapping system of one or more embodiments can help both residential customers and business customers provide more accurate locations on mapping databases so that friends, delivery services, emergency management services, and customers can reduce time spent by finding the correct residential and or business location faster. The automated mapping system embodiments may also be useful for locations that do not have a designated address, such as a location that is still under development, a location that is under redevelopment, a temporary setting, etc. During large construction projects, such as residential or commercial development or redevelopment, it is still important for suppliers and workers to quickly find the current location in the development site. The automatic mapping system embodiments described herein can be immensely helpful in directing suppliers, workers, inspectors, visitors, etc. to the desired location or locations in the development site. As well many rural locations and many locations in under-developed countries that do not have detailed and specified addresses. The automated mapping system embodiments can also be helpful in directing friends, delivery services, emergency responders, customers and the like to rural locations and locations in countries and jurisdictions that do not have a detailed and specific address system. Furthermore, the automated mapping system embodiments as described herein may also be used to provide location information in wilderness, alpine, aquatic, desert, and other similar areas where emergency response, search and rescue, or coast guard services may be needed to assist someone with the automated mapping system who is injured or otherwise in distress.

Figure 25:
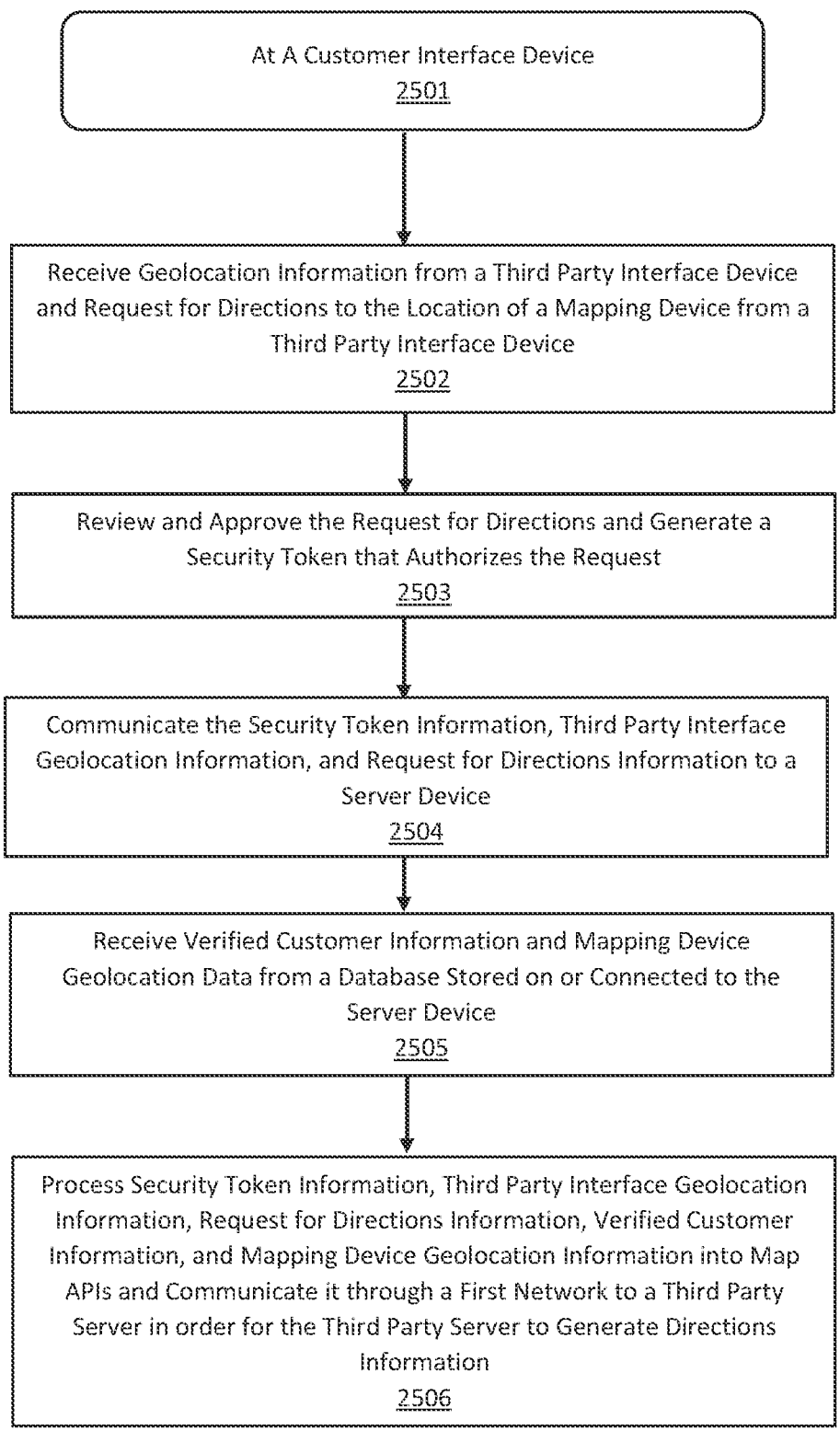
FIG. 25 shows an example process for processing and transmitting data from a customer interface device to a third-party server device, according to some embodiments.

FIG. 25 shows an example process 2500 for processing and transmitting data from a customer interface device (e.g., customer interface 1820, FIGS. 18-21) to a third-party server device (e.g., third party server 1816, FIGS. 18-19 and 21), according to some embodiments. In block 2501, process 2500 begins at the customer interface device. In block 2502, process 2500 provides that a communication module (e.g., communication module 1821, FIGS. 18-21) of the customer interface receives geolocation information and a request for directions to the location of a mapping device (e.g., the mapping device 1811, FIGS. 18-21) from a third party interface device (e.g., the third party interface 2070, FIGS. 20-21). The customer interface notifies the customer of the request. In block 2503, process 2500 provides that the customer uses the customer interface to review the request and third party identification information and approves the request. When the customer approves the request, the processor (e.g., processor 1823, FIGS. 18-21) of the customer interface device generates a security token that authorizes the request. In block 2504, process 2500 provides that a communications module of the customer interface transmits the security token, third party geolocation information, and the request for directions to the mapping device to a server (e.g., the server 1830, FIGS. 18-21) through a network (e.g., the first network 1840, FIGS. 18-21). In block 2505, process 2500 provides that a communications module (e.g., the communications module 1831, FIGS. 18-21) of the server (e.g. server 1830, FIGS. 18-21) receives the security token, third party geolocation information, and the request for directions to the mapping device from the customer interface. In block 2506, the process 2500 provides that a processor (e.g., processor 1833, FIGS. 18-21) of a server (e.g., server 1830, FIGS. 18-21) retrieves verified customer identification information and the mapping device location information from memory (e.g., the memory 1835, FIGS. 18-21) on the server (e.g., server 1830, FIGS. 18-21). In some embodiments, the processor of the server compares the verified customer identification information to the security token, and if there is a match, process 2500 further processes third party geolocation information, the request for directions to the mapping device and mapping device location, and generates map APIs. The communication module (e.g., communication module 1831, FIGS. 18-21) of the server transmits the map APIs to the third party server device through the network so the third party server may generate the directions.

Figure 26:
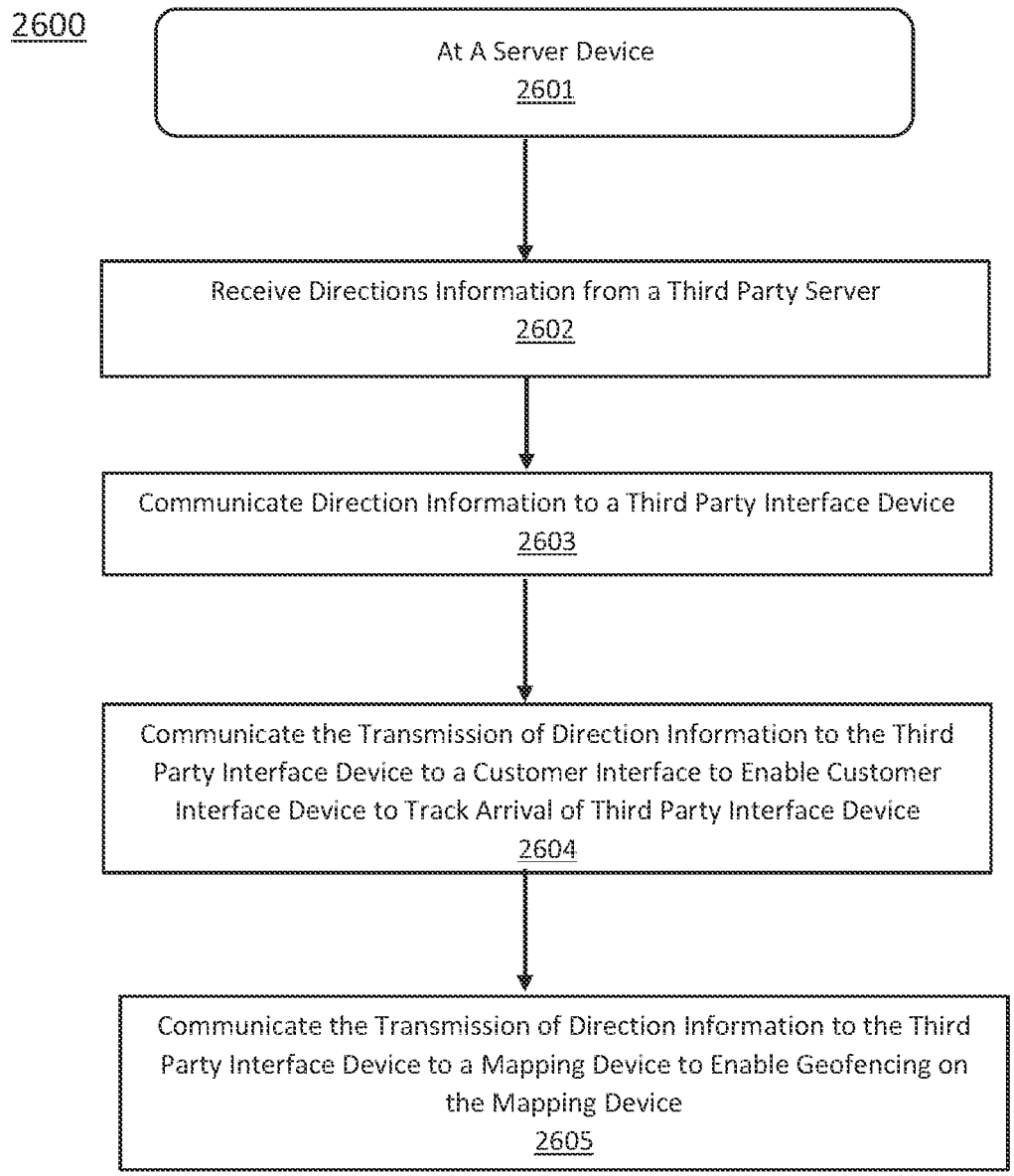
FIG. 26 shows an example of a process for processing and transmitting data from a server device to a mapping device, a customer interface device, and a third party interface device, according to some embodiments.

FIG. 26 shows an example of a process 2600 for processing and transmitting data from a server device (e.g., server 1830, FIGS. 18-21) to a mapping device (e.g., mapping device 1811, FIGS. 18-21), a customer interface device (e.g., customer interface 1820, FIGS. 18-21), and a third party interface device (e.g., third party interface 2070, FIGS. 20-21), according to some embodiments. In block 2601, process 2600 begins at the server device. In block 2602, process 2600 provides that a communication module (e.g., communication module 1831, FIGS. 18-21) of the server device receives directions from a third party server (e.g., third party server 1816, FIGS. 18-19 and 21). In block 2603, process 2600 provides that a processor (e.g., processor 1833, FIGS. 18-21) of the server device processes the directions and transmits them with the communication module of the server device through a network (e.g., the first network 1840, FIGS. 18-21) to the third party interface device. In block 2604, process 2600 provides that the communication module of the server device transmits the delivery of the directions to the third party through the network to a customer interface (e.g., the customer interface 1820, FIGS. 18-21). The customer may then track the arrival of the directions for the third party through the customer interface. In block 2605, process 2600 provides that the communication module (e.g., communication module 1831, FIGS. 18-21) of the server device transmits the delivery of the directions to the third party through the network to the mapping device so that the mapping device may enable geofencing features.

Figure 27:
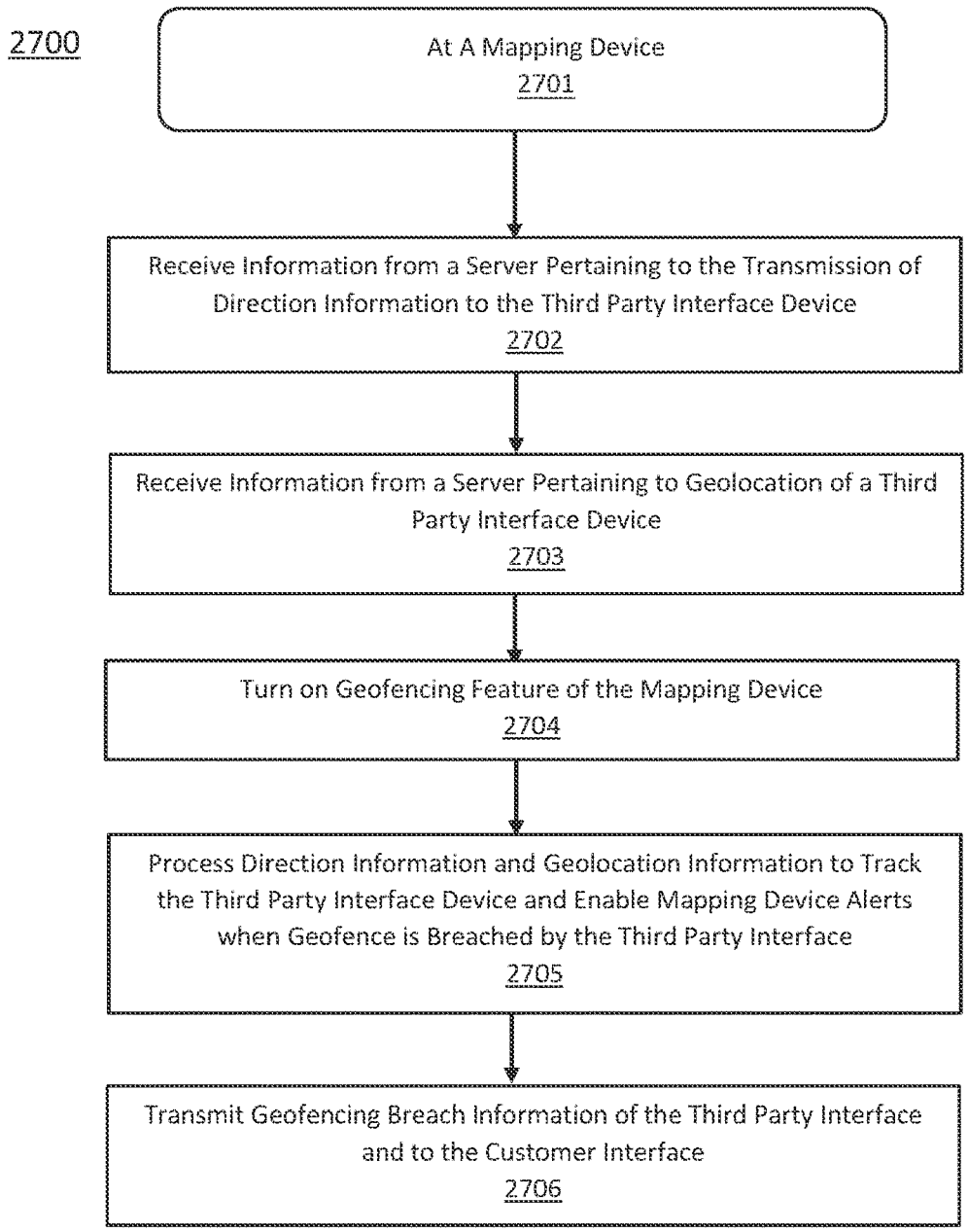
FIG. 27 shows an example of a process for processing a mapping function at a mapping device, according to some embodiments.

FIG. 27 shows an example of a process 2700 for processing a mapping function at a mapping device (e.g., mapping device 1811, FIGS. 18-21), according to some embodiments. In block 2701, process 2700 begins at the mapping device. In block 2702, process 2700 provides that a communication module (e.g., communication module 1812, FIGS. 18-21) of the mapping device receives a notice of transmission of delivery information (e.g., address, marker information, nearby businesses, traffic information, EMS information (e.g., entrance, parking structure information, obstacles, elevator, stairs, etc.) to a third party from a third party interface device (e.g., third party interface 2070, FIGS. 20-21) from a server (e.g., server 1830, FIGS. 18-21). In block 2703, process 2700 provides that the communication module of the mapping device receives geolocation information of the third party interface device from the server. In block 2704, process 2700 provides that a processor (e.g., processor 1813, FIGS. 18-21) of the mapping device turns on a geofencing feature (e.g., geofencing feature 2180, FIG. 21) of the mapping device. In block 2705, process 2700 provides that a processor (e.g., processor via module 1813, FIGS. 18-21) of the mapping device tracks the third party interface device geolocation and direction information until it detects breach of the geofencing feature. When the geofencing feature is breached, the third party interface alerts (e.g. via the alert device 2190, FIG. 21) of the mapping device are enabled. In block 2706, process 2700 provides that the communication module of the mapping device transmits geofencing breach information to a customer interface (e.g. customer interface 1820, FIGS. 18-21) through a network (e.g. the first network 1840, FIGS. 18-21).

In some embodiments, through a combination of the processes 2500, 2600 and 2700 described in FIGS. 25-27, the mapping device 1811, customer interface 1820, and server 1830 of the automated mapping systems (e.g., systems 1800, 1900, 2000 and 2100) provide secure authorized and location precise direction information to third parties. These processes also provide enhanced notification to the third parties that they have arrived at the mapping device 1811 location through the geofencing feature 2180 enabled alert device 2190. Alert devices 2190, such as bright flashing lights, audible alerts, pre-recorded audio or audio-visual greeting help, text messages, emails, telephone calls, etc. to guide third parties to the precise location. This alert may be helpful to delivery services to ensure accurate and time efficient deliveries. The alert may also be helpful to emergency responders. In some embodiments, the alert devices 2190 may be set to vary depending on the type of third party. For example, for emergency responders the alert devices 2190 may be bright flashing lights (e.g., red, blue, etc.) and loud (e.g., 70+ decibel, etc.) alarms. In contrast, for delivery services the alert devices 2190 may be bright different color(ed) flashing lights (e.g., green lights, yellow lights, etc.) and an audio recording that states information (e.g., the street address, approaching, side of street or building, location markers, etc.). The alert devices 2190 for friends or family of the customer may be festive multi-color twinkling lights and a favorite music track or a warm personal audio greeting (e.g., "Welcome to The Jones Family Home").

In one or more embodiments, the automatic mapping systems (e.g., systems 1800, 1900, 2000 and 2100, FIGS. 18-21) are not restricted to only one mapping device 1811. The automatic mapping systems may include multiple mapping devices 1811, such as mapping devices 1811 in close proximity to each other on the same street, cul-de-sac, apartment floor, wing of a shopping mall, etc. Multiple independent customers may provide connection of their mapping device 1811 to other nearby mapping devices 1811 such that a larger geofence may be created or so that alert devices 2190 may be sequentially enabled at various levels. For example, when a third party interface 2070 breaches a mapping device 1811 geofencing feature 2180 for a first mapping device 1811 two houses away from a final mapping device 1811, the alerts on the final mapping device 1811 may go off at a low level (just a couple of lights at low brightness and/or an audible sound, for example at 30 decibels). When the third party interface 2070 breaches a mapping device 1811 geofencing feature 2180 for a second mapping device 1811 one house away from the final mapping device 1811, the alerts on the final mapping device 1811 may go off at a medium level (e.g., a half dozen lights at a medium brightness and/or an audible sound at 45 decibels). Then the third party interface 2070 breaches a mapping device 1811 geofencing feature 2180 for the final mapping device 1811 at the destination, the alerts on the final mapping device 1811 may go off at a high level (e.g., a dozen bright flashing lights and/or audible sound at 60 decibels). Additionally, when the automatic mapping systems may include multiple mapping devices 1811, such as mapping devices 1811 in close proximity (e.g., location/distance, communication distance (e.g., based on type of wireless communication employed, etc.) to each other on the same street, cul-de-sac, apartment floor, wing of a shopping mall, etc., the automatic mapping systems may assist delivery services by providing optimal stops for delivering packages to multiple addresses without stopping at each address separately. This feature of the automatic mapping system improves the efficiency and reduces labor and fuel costs for delivery services.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

While the foregoing written description of the embodiments enables one of ordinary skill to make and use what is considered presently to be the best mode thereof, those of ordinary skill will understand and appreciate the existence of variations, combinations, and equivalents of the specific embodiments, method, and examples herein. The embodiments should therefore not be limited by the above-described embodiments, method, and examples, but by all embodiments and methods within the scope and spirit as claimed.

What is claimed is:

1. A mapping device comprising:
    a frame having an open front side, an open rear side, a top, a bottom, a left, and a right side forming an enclosure, wherein the open front side is convex shaped, and the open rear side is flat, wherein the left and right sides are rectangular;
    a first address plaque interchangeable coupled to the open front side, the first address plaque is curved;
    a second address plaque interchangeable coupled to the open rear side, wherein the second address plaque is flat;
    light-emitting diodes (LEDs) encased within the frame, wherein the LEDs are configured to produce a plurality of colors;
    a global positioning system (GPS) device having an inbuilt GPS antenna;
    a plurality of suction cups coupled to the open rear side of the frame, the plurality of suction cups are configured to mount the mapping device;
    a memory configured to store instructions;
    a processor configured to execute the instructions to:
        receive geolocation information for the mapping device from the global positioning system (GPS) device;
        receive unique identification information;
        transmit the geolocation information and the unique identification information through a network;
        cause prior geolocation information that corresponds to an address in a mapping database with the geolocation information, wherein the geolocation information comprises geographical coordinates and associated street address;
        create a geofence around the mapping device up to a predefined distance from the mapping device;
        trigger the LEDs to produce a preprogrammed color and cause any specific color LED to flash for signaling;
        receive a current geolocation of a movable object in near real time;
        detect presence of the current geolocation within the geofence;

upon detecting, generate an alert,
trigger an emergency signaling and receive a unique device ID of a summoned first responder;
detect an entry of the first responder based on the unique device ID within a predetermined area of the illuminated address sign assembly,
wherein the geolocation information is coupled to a street address of the mapping device, wherein the mapping device is configured to update one or more navigation systems with the street address and the geolocation information.

2. The mapping device of claim 1, wherein the geolocation information and the unique identification information are transmitted to a third-party server device through the network.

3. The mapping device of claim 2, wherein the processor is further configured to:
receive delivery information for enabling the geofence; and
enable the geofence, wherein a perimeter of the geofence is based on traffic flow information in an area of the geofence, wherein the control unit is configured to adjust the perimeter in near real time based on real-time traffic and street/location information that affects traffic flow.

4. The mapping device of claim 3, wherein the processor is further configured to:
track direction information of the moving object for detecting a breach of the geofence by the moving object.

5. The mapping device of claim 4, wherein the processor is further configured to execute the instructions to:
enable a first alert device upon detection of the breach;
transmit the breach information to a customer interface through the network; and
provide an alert from the first alert device.

6. The mapping device of claim 5, wherein the alert comprises a visible alert an audible alert, pre-recorded audio, an audio-visual alert, a text message, an email, or a telephone call, for guidance to a precise location of the mapping device, wherein the mapping device is configured to generate at least a visible alert when the movable object is within a predetermined distance from the mapping device.

7. The mapping device of claim 6, wherein the processor is further configured to:
connect the mapping device with a second mapping device at another location;
create a second geofence that is larger than the first geofence; and
enable a second alert device that is enabled with the first alert device.

8. The mapping device of claim 7, wherein the first alert and the second alert are enabled sequentially, and the first alert and the second alert are each enabled at different alert levels.

9. A method comprising:
receiving, by a mapping device, geolocation information for the mapping device from a global positioning system (GPS) device;
receiving, by the mapping device, unique identification information;
transmitting, by the mapping device, the geolocation information and the unique identification information through a network;
causing prior geolocation information that corresponds to an address in a mapping database with the geolocation information, wherein the geolocation information comprises geographical coordinates and associated street address;
creating a geofence around the mapping device up to a predefined distance from the mapping device;
receiving a current geolocation of a movable object in near real time;
detecting presence of the current geolocation within the geofence;
upon detecting, generating an alert;
coupling the mapping device with a plurality of other mapping devices spaced apart from each other to create a common geofence, wherein the plurality of other mapping devices creates levels, wherein different alerts are sequentially enabled at the different levels;
receiving, by the mapping device, delivery information for enabling the geofence; and
enabling the geofence, wherein a perimeter of the geofence is based on traffic flow information in an area of the geofence, wherein the control unit is configured to adjust the perimeter in near real-time based on real-time traffic and street/location information that affects traffic flow.

10. The method of claim 9, wherein the geolocation information and the unique identification information are transmitted to a third party server device through the network.

11. The method of claim 10, further comprising:
tracking direction information of the moving object for detecting a breach of the geofence by the moving object.

12. The method of claim 11, further comprising:
enabling, by the mapping device, a first alert device upon detection of the breach;
transmitting, the breach information to a customer interface through the network; and
providing, by the mapping device, an alert from the first alert device.

13. The method of claim 12, wherein the alert comprises a visible alert, an audible alert, pre-recorded audio, an audio-visual alert, a text message, an email, or a telephone call, for guidance to a precise location of the mapping device, wherein the mapping device is configured to generate at least a visible alert when the movable object is within a predetermined distance from the mapping device.

14. The method of claim 13, further comprising:
connecting the mapping device with a second mapping device of the plurality of other mapping devices at another location;
creating a second geofence that is larger than the first geofence; and
enabling a second alert device that is enabled with the first alert device.

15. The method of claim 14, wherein the first alert and the second alert are enabled sequentially, and the first alert and the second alert are each enabled at different alert levels.

* * * * *